US009351137B2

(12) United States Patent
Kasilya Sudarsan et al.

(10) Patent No.: US 9,351,137 B2
(45) Date of Patent: May 24, 2016

(54) SIMULTANEOUS VOICE CALLS USING A MULTI-SIM MULTI-ACTIVE DEVICE

(71) Applicant: QUALCOMM Incorporated, San Diego, CA (US)

(72) Inventors: Vishnu Vardhan Kasilya Sudarsan, Hyderabad (IN); Debesh Kumar Sahu, Hyderabad (IN); Vishvadeep Devnani, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/330,806

(22) Filed: Jul. 14, 2014

(65) Prior Publication Data

US 2016/0014579 A1   Jan. 14, 2016

(51) Int. Cl.
*H04W 4/16* (2009.01)
*H04M 1/725* (2006.01)
*H04M 1/60* (2006.01)
*H04W 76/02* (2009.01)
*H04W 88/04* (2009.01)

(52) U.S. Cl.
CPC .............. *H04W 4/16* (2013.01); *H04M 1/6066* (2013.01); *H04M 1/7253* (2013.01); *H04M 1/72563* (2013.01); *H04W 76/025* (2013.01); *H04W 88/04* (2013.01)

(58) Field of Classification Search
None
See application file for complete search history.

(56) References Cited

U.S. PATENT DOCUMENTS

| 7,929,993 | B2 | 4/2011 | Nagarajan | |
| 8,108,001 | B2* | 1/2012 | Chishti | H04M 1/0202 455/419 |
| 8,457,078 | B2 | 6/2013 | Yang et al. | |
| 2008/0118054 | A1 | 5/2008 | McArdle | |
| 2008/0293394 | A1* | 11/2008 | Silver | H04M 3/42238 455/417 |
| 2012/0115542 | A1* | 5/2012 | Griffin | H04W 8/205 455/552.1 |
| 2012/0178500 | A1 | 7/2012 | Hwang | |
| 2013/0303203 | A1 | 11/2013 | Wang et al. | |
| 2014/0024353 | A1 | 1/2014 | Baek et al. | |
| 2014/0038569 | A1 | 2/2014 | Chin et al. | |
| 2014/0038666 | A1 | 2/2014 | Chin et al. | |
| 2014/0273974 | A1 | 9/2014 | Varghese et al. | |

FOREIGN PATENT DOCUMENTS

WO   2013007869 A1   1/2013

OTHER PUBLICATIONS

International Search Report and Written Opinion—PCT/US2015/035560—ISA/EPO—Oct. 15, 2015.

* cited by examiner

*Primary Examiner* — King Poon
*Assistant Examiner* — Vincent Peren
(74) *Attorney, Agent, or Firm* — The Marbury Law Group, PLLC

(57) ABSTRACT

Devices, systems, and methods for handling simultaneous calls on a multi-subscriber identification module (SIM) multi-active (MSMA) device having at least a first SIM associated with a first transceiver and a second SIM associated with a second transceiver. A processor of the MSMA device may establish a first SIM call using the first transceiver and a second SIM call using the second transceiver while the first SIM call is active. The processor may also establish a direct wireless link to a second mobile communication device using a third transceiver. The processor may maintain both the first and second SIM calls active simultaneously by handling the first SIM call using an input/output device of the MSMA device and relaying the second SIM call to the second communication device via the direct wireless link.

30 Claims, 12 Drawing Sheets

US 9,351,137 B2

SIMULTANEOUS VOICE CALLS USING A MULTI-SIM MULTI-ACTIVE DEVICE

RELATED APPLICATIONS

This application is related to U.S. patent application Ser. No. 14/330,236 entitled "Multiple Active Voice Calls on a Multi-SIM Multi-Active Device" that is filed contemporaneously herewith and commonly assigned to Qualcomm Incorporated, the entire contents of which are hereby incorporated by reference for all purposes.

BACKGROUND

Multi-SIM devices, such as cellular telephones, are devices that include more than one subscriber identification module (SIM). Multi-SIM devices have become increasing popular because of the versatility that they provide, particularly in countries where there are many service providers. For example, dual-SIM devices may allow a user to implement two different cellular service subscriptions or plans with different service providers, with separate numbers and bills, on the same device (e.g., business account and personal account). In addition, during travel, users can obtain local SIM cards and pay local call rates in the destination country. By using multiple SIMs, a user may take advantage of different service pricing plans and save on mobile data usage.

Multi-SIM multi-active (MSMA) devices have two or more SIMs using at least two separate radio resource chains. For example, a dual-SIM dual-active (DSDA) device can separately accommodate simultaneous wireless services. However, when both wireless services are voice calls, only one of those simultaneous voice calls may be active at a time because DSDA devices use one speaker and one microphone for conducting a voice call. Thus, the DSDA device places one voice call (i.e., the non-active voice call) in a hold state while the other voice call (i.e., the active call) uses the speaker and microphone. Other than merging the two calls into a conference call (which may be undesirable in most circumstances), a user has no way of talking/listening on two active voice calls at the same time.

SUMMARY

Methods, devices, and systems of various embodiments enable the handling of simultaneous calls on a multi-SIM multi-active (MSMA) device having at least a first subscriber identification module (SIM) associated with a first transceiver and a second SIM associated with a second transceiver. A processor may establish a first SIM call using the first transceiver and a second SIM call using the second transceiver while the first SIM call is active by establish a direct wireless link to a second mobile communication device using a third transceiver and relaying the second SIM call to the second communication device via the direct wireless link while handling the first SIM call using an input/output device of the MSMA device. In this manner, both the first and second SIM calls are maintained active simultaneously.

In some embodiments, the direct wireless link may be established by pairing the second mobile communication device with the MSMA device before establishing the second SIM call. Establishing the direct wireless link may include pairing the second mobile communication device with the MSMA device in response to establishing the second SIM call. The direct wireless link may be a Bluetooth communication link providing a direct audio stream connection between the MSMA device and the second mobile communication device. The direct wireless link may be a Wi-Fi communication link between the MSMA device and the second mobile communication device. The input/output device of the MSMA device may be an onboard microphone and an onboard speaker of the MSMA device. The input/output device of the MSMA device may be a remote device coupled to the MSMA device, such as a Bluetooth headset. At least one of the first SIM call and the second SIM call may be an incoming voice call received by the MSMA device. At least one of the first SIM call and the second SIM call may be an outgoing voice call initiated from the MSMA device. The MSMA device may be a dual-SIM dual-active (DSDA) device. In some embodiments, the third transceiver communicates using a type of protocol that is different from that of the first transceiver and the second transceiver. In some embodiments, the third transceiver is a Bluetooth transceiver or a Wi-Fi transceiver.

In some embodiments, establishing the second SIM call using the second transceiver while the first SIM call is active may include receiving the second SIM call while the first SIM call is maintained active. In some embodiments, a user may be prompted regarding the received second SIM call, and the MSMA device may receive a user input regarding maintaining both calls active and designating either the MSMA device or the second communication device to handle the second SIM call. The second SIM call may be established in response to the received user input electing to accept the second SIM call and maintain the first SIM call active.

In some embodiments, an incoming call signal may be transmitted by the MSMA device to the second mobile communication device over the first direct wireless link, and a call acceptance signal may be received from the second mobile communication device in response to transmitting the incoming call signal. Also, relaying of the second SIM call to the second communication device via the direct wireless link may be initiated by the MSMA device in response to receiving the call acceptance signal from the second mobile communication device.

In some embodiments, a communication feed between the second transceiver and the input/output device of the MSMA device may be established handling the second SIM call in response to the first SIM call terminating. The second SIM call may be maintained active using both the input/output device of the MSMA device and the second communication device via the direct wireless link in response to the first SIM call terminating. In response to one of the first SIM call and the second SIM call terminating the user may be prompted to input regarding whether to maintaining the other call (i.e., the call that was not terminated) active.

Further embodiments include an MSMA device configured to perform the operations of the embodiment methods discussed above.

Further embodiments include an MSMA device having means for performing functions of the embodiment methods discussed above.

Further embodiments include a non-transitory processor-readable storage medium having stored thereon processor-executable instructions configured to cause a processor of an MSMA device to perform operations of the embodiment methods discussed above.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

Figure 1:
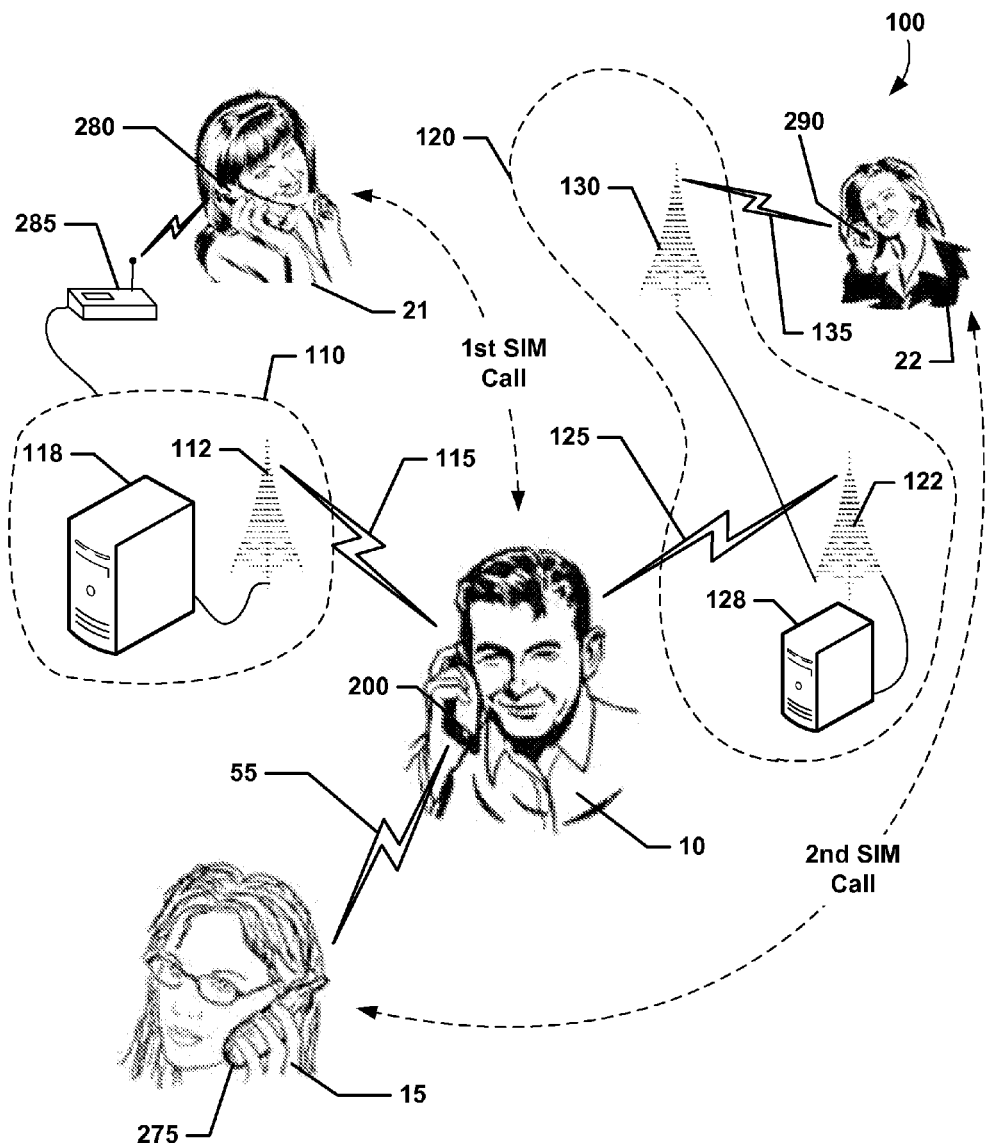
FIG. 1 is a communication system block diagram of a communication system according to various embodiments.

Various embodiments will be described in detail with reference to the accompanying drawings. Wherever possible the same reference numbers will be used throughout the drawings to refer to the same or like parts. References made to particular examples and implementations are for illustrative purposes, and are not intended to limit the scope of the invention or the claims.

Various embodiments enable at least two simultaneous voice calls to be maintained active on a MSMA mobile communication device, while keeping those voice calls separate. For example, a first voice call using a first SIM (which is also referred to herein as a "first SIM call") may be maintained active using a first speaker-microphone pair of the MSMA device, while a second voice call using a second SIM (which is also referred to herein as a "second SIM call") may be simultaneously maintained active using a second mobile communication device by way of a wireless connection to the MSMA device.

The MSMA device may already have a first SIM call established and active in a conventional sense. The MSMA device may give the user a choice about handling the two calls when simultaneously receiving or initiating a second SIM call. The choice may allow the user to direct the second SIM call to another person using his or her own mobile communication device. The other person may take the second voice call as long as the second mobile communication device is capable of actively maintaining a voice call and maintaining a communication connection with the MSMA device. Alternatively, the choice may allow the user to switch the first SIM call to the other mobile communication device and receive the second SIM call on the speaker-microphone pair previously used for the first SIM call. In this way, the choice may allow the user to direct each voice call selectively.

A single MSMA device may include at least two different ports that may simultaneously transmit and receive the communications associated with an individual voice call. One port may feed audio signals to and receive audio signals from a speaker-microphone pair of the MSMA device. A second port may feed audio signals to and receive audio signals from a second mobile communication device via a direct wireless link between the two devices, such as a Bluetooth® paired connection or a Wi-Fi Direct connection. The voice call using the MSMA device speaker-microphone pair may operate independently from the speaker-microphone pair of the other mobile communication device. The various embodiments may enable separate users to simultaneously use two separate radio resources of the single MSMA device to conduct two separate voice calls.

The terms "mobile communication device" and "multi-SIM device" are used interchangeably herein to refer generally to any one or all of cellular telephones, smart phones, personal or mobile multi-media players, personal data assistants (PDAs), laptop computers, tablet computers, smart books, palm-top computers, wireless electronic mail receivers, multimedia Internet enabled cellular telephones, wireless gaming controllers, and similar personal electronic devices that include a programmable processor and memory, and circuitry for establishing wireless communication pathways and transmitting/receiving data via at least one wireless communication pathway enabled by two or more SIMs.

The term "multi-SIM multi-active device" and "MSMA device" are used interchangeably to refer to a multi-SIM device with two or more SIMs and at least two radio resources configured for simultaneously maintaining at least two SIM communication sessions active. While various embodiments describe a DSDA device, which is a MSMA device having two SIMs and two separate radio resources, a multi-SIM device may have more than two SIMs. For example, a quad-SIM dual-active device includes four SIMs sharing two sets of radio resources. While a quad-SIM dual-active device may establish service with networks for as many as four SIMs, only two voice calls may be active at once. Other types of MSMA devices include a tri-SIM tri-active device and a quad-SIM quad-active device, which may include additional separate radio resources for each of the available SIMs.

As used herein, the terms "SIM," "SIM card," and "subscriber identification module" are used interchangeably to refer to a memory that may be an integrated circuit or embedded into a removable card, and that stores an International Mobile Subscriber Identity (IMSI), related key, and/or other information used to identify and/or authenticate a mobile communication device on a network and enable a communication service with the network. Because the information stored in a SIM enables the mobile communication device to establish a communication link for a particular communication service or services with a particular network, the term "SIM" is also be used herein as a shorthand reference to the communication service associated with and enabled by the information stored in a particular SIM as the SIM and the communication network, as well as the services and subscriptions supported by that network, correlate to one another. Similarly, the term SIM may also be used as a shorthand reference to the protocol stack and/or modem stack and communication processes used in establishing and conducting communication services with subscriptions and networks enabled by the information stored in a particular SIM. For example, references to assigning a radio resource to a SIM (or granting a SIM radio access) means that the radio resource has been allocated to establishing or using a communication service with a particular network that is enabled by the information stored in that SIM.

As used herein, the terms "radio access network," "wireless network," and "cellular network" are used interchangeably to refer to a radio access network of one or more telecommunication carriers associated with a mobile communication device and/or subscription on a mobile communication device, and/or its roaming partners. A radio access network is generally a network that covers a broad area (i.e., any telecommunications network that links across metropolitan, regional, national or international boundaries).

As used herein, the terms "first SIM call," "second SIM call," "SIM call," or "SIM calls" refer to voice calls from a mobile communication device using a SIM to communicate with a radio access network over a wide geographic region. Such telephone calls are "indirect" since they use a wireless access point to connect to the radio access network. For example, the radio access network may be a cellular network provided by a telecommunication carrier allowing access to public telephone networks from local base stations that serve as wireless access points.

As used herein, the term "direct wireless link" is used to refer to relatively short-range wireless data communication connection directly between two mobile communication devices or within a personal area network. Unlike a SIM call, a direct wireless link does not include an intermediary wide area network (WAN) access point. For example, a direct wireless link may use Bluetooth or Wi-Fi standards/protocols to link directly two mobile communication devices.

In a MSMA device, since each SIM is associated with a separate radio resource (e.g., a DSDA communication device), the SIMs and their associated modem stacks may independently acquire and register for service with selected networks using the information stored in the respective SIMs. Depending on the particular communication protocols and/or radio access technologies of the selected networks, service acquisition and registration may include camping on a suitable cell of the network, and alerting the network of the presence in the serving cell. Successfully registering in a network, allows the modem stack corresponding to a SIM to operate in idle mode until a call is received or initiated. In an idle mode, the modem stack may perform functions such as monitoring a paging channel and performing cell reselection and location updates as needed.

When a network in which a SIM is registered receives a mobile terminating call, following authentication, a call setup may be sent to the mobile communication device, which may respond to indicate whether the particular call type is enabled by the information stored in the SIM. If so, the processor may allocate the assigned traffic channel and the call is established. Once established, the processor manages data sent and received using the radio resource associated with that SIM, as well as onboard and/or remote resources.

In this manner, in a MSMA device, each radio resource associated with a SIM and its corresponding modem stack may operate as an independent device despite being co-located and sharing non-network based resources with one another (e.g., user input/output resources, general processor and storage, etc.). Such independent functionality provides multiple user benefits, such as providing the user with essentially multiple different phones in the same physical housing. The various embodiments extend the benefits to include being able to conduct two SIM calls at the same time.

FIG. 1 illustrates a communication system 100 accessed by a mobile communication device, such as a MSMA device 200, handling simultaneous calls. The MSMA device 200 may have at least a first SIM associated with a first radio resource and a second SIM associated with a second radio resource. Each radio resource may include an antenna coupled to a receive and transmit radio coupled to a modem with communication stacks, encoders and decoders and related circuitry, which for ease of description are referred to herein as a "transceiver." So configured, the MSMA device 200 may simultaneously establish and maintain wireless connections with more than one cell tower or base station of one or more radio access networks. A first SIM call (1st SIM Call) may be established using the first SIM and a second SIM call (2nd SIM Call) may be established using the second SIM. The first SIM call may be maintained active for a main user 10 listening to an onboard speaker and/or speaking into and onboard microphone of the MSMA device 200. Meanwhile, the second SIM call may be simultaneously maintained active with a second mobile communication device 275 used by a secondary user 15 using a direct wireless link 55.

The MSMA device 200 may establish and maintain the first SIM call using the first SIM to transmit/receive data through a first connection 115 to a first base station 112. The first base station 112 may be part of a first radio access network 110, which may be used to establish the first SIM call with a first third-party 21. The first third-party 21 may access the first radio access network 110 in various ways, such as through a fixed telephone line connection to the first radio access network 110. For example, the first third-party 21 may use a wireless handset 280, which may use short-range wireless connection, in conjunction with a personal base station 285 having a landline connection with access to the first radio access network 110. The main user 10 may communicate in this way with any third-party with access to a radio access network.

In addition, the MSMA device 200 may simultaneously establish and/or maintain the second SIM call using the second SIM to transmit/receive data through a second connection 125 to a second base station 122. The second base station 122 may be part of a second radio access network 120, used to establish the second SIM call with a second third-party 22. The second third-party 22 may access the second radio access network 120 in various known ways, such as using a third-party mobile communication device 290 and its own wireless connection 135 to another base station 130 of the second radio access network 120.

The MSMA device 200 may use the direct wireless link 55 in order to extend the second SIM call through to the second mobile communication device 275. In this way, the secondary user 15 may communicate with the second third-party 22 on the second SIM call by way of the MSMA device 200. The second mobile communication device may be any type of mobile communication device that includes a microphone and/or speaker. In various embodiments, audio signals may be transferred to the second mobile communication device 275 via a Bluetooth connection; however, any wired or wireless connection may be used. In this way, the second mobile communication device 275 may be plugged into the MSMA device 200 through an input/output connector.

The radio access networks 110, 120 may be cellular data networks, and may use channel access methods including, but not limited to, Global System for Mobile Communications (GSM), Universal Mobile Telecommunications Systems (UMTS) (particularly, Long Term Evolution (LTE)), Frequency Division Multiple Access (FDMA), Time Division Multiple Access (TDMA), Code Division Multiple Access (CDMA), Wi-Fi, PCS, 3G, 4G, or other protocols that may be used in a wireless communications network or a data communications network. The radio access networks 110, 120 may also be referred to by those of skill in the art as access networks, wireless networks, base station subsystems (BSSs), UMTS Terrestrial Radio Access Networks (UTRANs), etc. The radio access networks 110, 120 may use the same or different wireless interfaces and/or physical layers. In some embodiments, the base stations 112, 122 may be controlled by one or more base station controllers 118, 128. Each radio access network 110, 120 may have additional base stations and/or BSC, as well as other components, as is known in the art. Alternate network configurations may also be used and the embodiments are not limited to the configuration illustrated. For example, in other embodiments, the functionality of the base station controller 118 and at least one of base stations 112, 122, 130 may be collapsed into a single "hybrid" module having the functionality of these components.

In various embodiments, the MSMA device 200 may simultaneously access the radio access networks 110, 120 after camping on cells managed by one or more of the base stations 112, 122. Each of the radio access networks 110, 120 may provide various services to the MSMA device 200 via the respective first and second connections 115, 125. In various embodiments, radio access networks 110, 120 may each include a circuit-switched (CS) domain. Examples of circuit-switched entities that may be part of the radio access networks 110, 120 include a mobile switching center (MSC) and visitor location register (VLR), as well as Gateway MSCs GMSCs. The radio access networks 110, 120 may be interconnected by connections from respective GMSCs to the public switched telephone network (PSTN), across which the radio access networks 110, 120 may route various incoming and outgoing communications to the MSMA device 200.

One or more of the radio access networks 110, 120 may also include a packet-switched (PS) domain. Example packet-switched elements that may be part of the radio access network 120 include a Serving GPRS Support Node (SGSN) and a Gateway GPRS Support Node (GGSN). The GGSN may connect to an IP network, across which the radio access network 110, 120 may route IP data traffic to and from the MSMA device 200. Other network entities (not shown) that may be part of the radio access networks 110, 120 may include an Equipment Identity Register (EIR), Home Location Register (HLR), and Authentication Center (AuC), some or all of which both the circuit-switched and packet-switched domains may share.

The MSMA device 200 may also establish connections to radio access networks via Wi-Fi access points, which may connect to the Internet. While various embodiments are particularly useful with radio access networks, the embodiments are not limited to wireless networks and may be implemented over wired networks with no changes to the methods.

The MSMA device 200 may be capable of operating with a number of radio access networks enabled by information stored in a plurality of SIMs. Using dual-SIM functionality, the MSMA device 200 may simultaneously access the two radio access networks 110, 120 by camping on cells managed by the base stations 112, 122. For example, the first SIM call may be a voice or data call to the first third-party 21, such as to the wireless handset 280, using a service enabled by information stored in the first SIM, as well as the protocol stack associated with that SIM, via a first set of the radio resources, referred to herein collectively as a first transceiver. The MSMA device 200 may also simultaneously establish the second SIM call, which may be a voice call or data call to the second third-party 22, in a similar manner using a service enabled by information stored in the second SIM, as well as the protocol stack associated with the second SIM, via a second radio resource, referred to herein collectively as a second transceiver. The communication devices used by the first third-party 21 and/or the second third-party 22 may be any communication device, including but not limited to a landline phone, mobile phone, laptop computer, PDA, server, etc.

The MSMA device 200 may include more than two SIMs (e.g., tri-SIM, quad-SIM, etc.). In this way, simultaneous calls may be established and maintained on more than two networks via the single MSMA device 200. A processor of the MSMA device 200 may use additional communication ports (other than a Bluetooth radio resource), such as Wi-Fi or a wired connection, to connect a third call of a third SIM or a fourth call of a fourth SIM to additional remote speaker/microphone resources or additional mobile communication devices (i.e., a third and/or fourth mobile communication device).

Some or all of the MSMA devices 200 may be configured with multi-mode capabilities and may include multiple transceivers for communicating with the different radio access networks 110, 120 over different wireless links/radio access technologies. For example, a MSMA device 200 that is a DSDA device may be configured to camp two SIMs on cells of two different networks though separate transmit/receive chains (i.e., independent radio resources) and communicate over the two networks on different subscriptions. For example, while the techniques and embodiments described herein relate to a MSMA device configured with at least one GSM subscription, they may be extended to subscriptions on other radio access networks (e.g., CDMA2000, UMTS, WCDMA, LTE, etc.).

Figure 2:
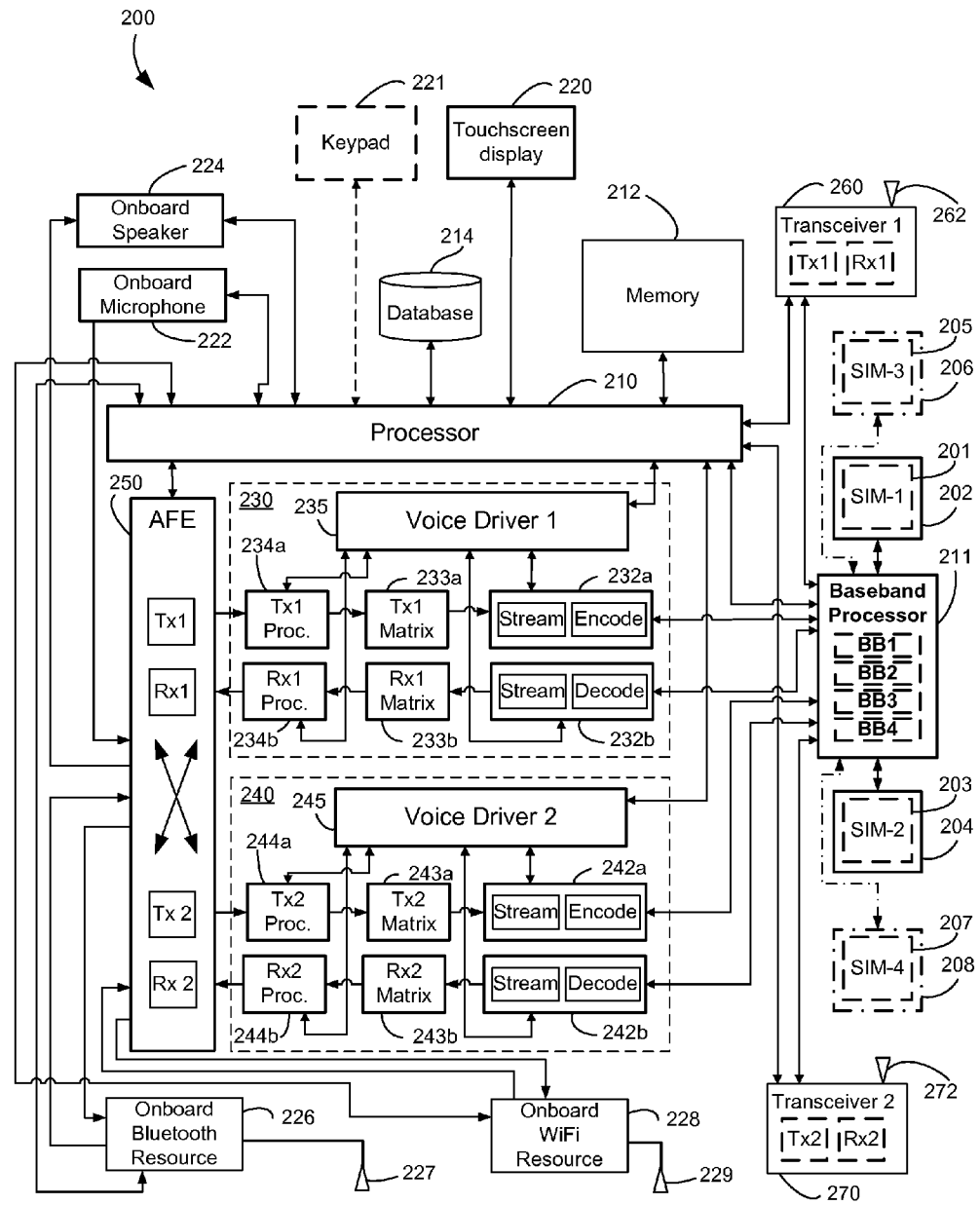
FIG. 2 is a component block diagram illustrating a MSMA device according to various embodiments.

FIG. 2 illustrates a functional block diagram of an example of the MSMA device 200 that is suitable for implementing various embodiments. With reference to FIGS. 1-2, the MSMA device 200 may receive a first SIM 201, associated with a first subscription, through a first SIM interface 202. The MSMA device 200 may receive a second SIM 203, associated with a second subscription, through a second SIM interface 204. Optionally, the MSMA device 200 may include or be configured to receive more than two SIMs. For example, a tri-SIM embodiment may include a third SIM 205, associated with a third subscription, through a third SIM interface 206 and a quad-SIM embodiment may additionally include a fourth SIM 207, associated with a fourth subscription, through a fourth SIM interface 208.

Each of the SIMs 201, 203, 205, 207 used in various embodiments may contain user account information, an application toolkit, commands and storage space for phone book contacts and other information. The SIMs 201, 203, 205, 207 may further store home identifiers (e.g., a System Identification Number (SID)/Network Identification Number (NID) pair, a Home Public Land Mobile Network (HPLMN) code, etc.) to indicate the SIM network operator provider or an Integrated Circuit Card Identity (ICCID).

The MSMA device 200 may include at least one controller, such as a general-purpose processor 210, which may be coupled to a baseband modem processor 211 (or individual separate baseband modem processors BB1, BB2, BB3, BB4, if applicable). Each of the SIMs 201, 203, 205, 207 may be associated with a baseband-RF resource chain. Each baseband-RF resource chain may include or be coupled to the baseband modem processor 211 to perform baseband/modem functions for communications on a SIM, and one or more amplifiers and radios, referred to generally herein as access network transceivers 260, 270. In various embodiments, the baseband modem processor 211 may be common to all baseband-RF resource chains (i.e., a single device that performs baseband/modem functions for all SIMs on the wireless device). Alternatively, each baseband-RF resource chain may include physically or logically separate baseband modem processors (e.g., BB1, BB2, BB3, BB4).

The access network transceivers 260, 270 may each be communication circuits or transceivers that perform transmit/receive functions for the associated SIM of the wireless device. The access network transceivers 260, 270 refer to communication circuits that include separate transmit and receive circuitry, or may include a transceiver that combines transmitter and receiver functions. The access network transceivers 260, 270 may be coupled to a wireless antenna (e.g., a first antenna 262 and a second antenna 272) for transmitting/receiving signals corresponding to wireless services associated with each SIM 201, 203, 205, 207 of the MSMA device 200. In addition, each of the access network transceivers 260, 270 may have corresponding antennas 262, 272 for sending and receiving RF signals, providing separate transmit and receive functionality for the SIMs 201, 203, 205, 207. In this way, the MSMA device 200 may perform simultaneous communications with separate networks and/or service associated with the SIMs, or may include a transceiver that combines transmitter and receiver functions.

The access network transceivers 260, 270 may provide a network interface to the radio access networks by managing radio functions of one or more transceiver. The access network transceivers 260, 270 may include their own random-access memory (RAM) and firmware. The access network transceivers 260, 270 may also be coupled to the general-purpose processor 210 and the baseband modem processor 211. The access network transceivers 260, 270 and the respective antennas 262, 272 may enable the MSMA device 200 to perform simultaneous communications with separate networks and/or service associated with the SIMs. With two of the access network transceivers 260, 270, the MSMA device 200 may function as a dual-active device (i.e., capable of communicating simultaneously with two different wireless access networks). Optionally, additional transceivers may be provided, along with corresponding additional SIMs (e.g., SIM-3 205 or SIM-4 207) in order to provide tri-active or quad-active capabilities. A tri-active device may maintain three simultaneous communications with three separate networks and/or service associated with at least three SIMs. In addition, a quad-active device may maintain four simultaneous communications with four separate networks and/or service associated with at least four SIMs.

The general-purpose processor 210 may be coupled to various on-board resources, including a touch screen display 220, which may output visual indications and service as an input device, such as providing a keypad or general user interface. Alternatively or in addition, the MSMA device 200 may include a separate keypad 221 coupled to the processor for receiving user input. In addition, the general-purpose processor 210 may be coupled to an onboard microphone 222 and an onboard speaker 224 for audio input and output, respectively (referred to collectively as the onboard microphone/speaker 222, 224). An onboard Bluetooth resource 226 may also be coupled to the general-purpose processor 210. The onboard Bluetooth resource 226 and onboard Bluetooth transceiver 227 may serve as a dedicated RF resource chain for Bluetooth communications with a paired remote mobile communication device (e.g., the second mobile communication device 275). An onboard Wi-Fi resource 228 may also be coupled to the general-purpose processor 210. The onboard Wi-Fi resource 228 and the onboard Wi-Fi transceiver 229 may service as a dedicated RF resource chain for Wi-Fi communications with a connected remote mobile communication device. While Bluetooth and Wi-Fi connections are illustrated, additional communication resources and associated transceivers may be provided and used for remote connections to mobile communication devices.

An analog front-end (AFE) component 250 may be coupled to the general-purpose processor 210, as well as sensors and particularly select input/output components (e.g., the onboard microphone 222, the onboard speaker 224, the onboard Bluetooth resource 226, and the onboard Wi-Fi resource 228). The AFE component 250 may be a set of analog signal conditioning circuitry that uses operational amplifiers, filters, and sometimes application-specific integrated circuits to provide a configurable and flexible analog to digital conversion for interfacing to components coupled thereto. The AFE component 250 may include a switch, or work with a separate switch component, in order to direct voice signaling between the appropriate input/output component and corresponding voice driver module 230, 240.

In various embodiments, the general-purpose processor 210 may control the AFE component 250 in order to direct signals received from the onboard microphone 222, the onboard Bluetooth resource 226, and/or the onboard Wi-Fi resource 228 to the appropriate access network transceiver 260, 270. Similarly, the general-purpose processor 210 may control the AFE component 250, in the other direction, in order to direct signals received from voice driver modules 230, 240 to the appropriate input/output component. In this way, voice call communications using a particular SIM 201, 203, 205, 207 may be associated with a select input/output device, such as the onboard microphone/speaker 222, 224, a device paired through Bluetooth® via the onboard Bluetooth resource 226, or a device connected through Wi-Fi via the onboard Wi-Fi resource 228. For example, in response to the main user 10 selecting to use the onboard microphone/speaker 222, 224 for a voice call using the first SIM (referred to as a "first SIM call"), the AFE component 250 may be configured to channel signals between the onboard microphone/speaker 222, 224 and the access network transceiver 260 associated with the first SIM 201. In addition, if the main user 10 decides to switch that first SIM call to the second mobile communication device 275 via Bluetooth®, the general-purpose processor 210 may in-turn configure the AFE component 250 to switch internal connections/routing such that signals are channeled between the appropriate access network transceiver 260, 270 associated with the first SIM 201 and the onboard Bluetooth transceiver 227 via the onboard Bluetooth resource 226.

Each of the voice driver modules 230, 240 may be coupled to the general-purpose processor 210 through a respective voice driver 235, 245, which manages voice streams to correspond to devices used in conjunction with those voice streams. In addition, each of the voice driver modules 230, 240 may include a respective transmitting encoder 232a, 242a, which may be coupled to the corresponding voice driver 235, 245 and the baseband modem processor 211, and may perform stream processing and encoding/encrypting of data before signals are transmitted to the baseband modem processor 211 and access network transceivers 260, 270. Each of the transmitting encoders 232a, 242a may receive one or more signals from a respective transmitting audio matrix 233a, 243a, which processes received multichannel audio signals for later playback. Each of the transmitting audio matrix 233a, 243a may receive one or more signals from a respective transmitting pre-processor 234a, 244a, which receives the processed audio signals from the AFE component 250. The transmitting encoders 232a, 242a and transmitting pre-processors 234a, 244a may also be coupled to and controlled by the corresponding voice driver 235, 245. In this way, the transmitting pre-processor 234a, 244a, the transmitting audio matrix 233a, 243a, and the transmitting encoder 232a, 242a work together to process and transmit signals from the AFE component 250 to the baseband modem processor 211 and access network transceivers 260, 270.

For handling received audio signals, each of the voice driver modules 230, 240 may include a respective receiving decoder 232b, 242b, which may be coupled to the corresponding voice driver 235, 245 and the baseband modem processor 211, and may perform stream processing and decoding after signals are received from the access network transceiver 260, 270. Each of the receiving decoders 232b, 242b may forward one or more signals to a respective receiving audio matrix 233b, 243b that processes received multichannel audio signals for local playback. Each of the receiving audio matrix 233b, 243b may forward one or more signals to a respective receiving pre-processor 234b, 244b that directs the processed audio signals to the AFE component 250. The receiving pre-processor 234b, 244b may also be coupled to and controlled by the corresponding voice driver 235, 245. In this way, the receiving pre-processor 234b, 244b, the receiving audio matrix 233b, 243b, and the receiving decoder 232b, 242b work together to receive and process signals from the access network transceivers 260, 270, by way of the baseband modem processor 211, to the AFE component 250.

The general-purpose processor 210 may also be coupled to at least one memory 212. The memory 212 may be a non-transitory processor-readable storage medium that stores processor-executable instructions. For example, the memory may store processor-executable instructions for routing communication data relating to the first or second SIM subscriptions associated with a corresponding transceiver. The memory 212 may store operating system (OS) instructions, as well as user application software and executable instructions.

In various embodiments, the general-purpose processor 210, the baseband modem processor 211, the memory 212, the voice driver modules 230, 240, the AFE component 250, and/or the access network transceivers 260, 270 may be integrated on a system-on-chip device. In some embodiments, any one or more of the general-purpose processor 210, the baseband modem processor 211, the memory 212, the voice driver modules 230, 240, the AFE component 250, and/or the access network transceivers 260, 270 need not be integrated on the system-on-chip or may be integrated on a separate system-on-chip. The first, second, third, and fourth SIMs 201, 203, 205, 207 and their corresponding SIM interfaces 202, 204, 206, 208 may be external to the system-on-chip device. Further, various input and output devices may be coupled to components of the system-on-chip, such as interfaces or controllers. In addition, the general-purpose processor 210 may be coupled to additional resources, such as a database 214 for storing and accessing call information.

In various embodiments, the touch screen display 220, the keypad 221, the onboard microphone 222, the second mobile communication device 275 (coupled through the onboard Bluetooth resource 226 and the onboard Bluetooth transceiver 227 or the onboard Wi-Fi resource 228 and the onboard Wi-Fi transceiver 229), or a combination thereof, may perform the function of receiving a request to initiate an outgoing call, accept and incoming call or even switch from using onboard resources to using remote resources. For example, the touch screen display 220 may receive a selection of a contact from a contact list or receive a telephone number for initiating a call. In another example, either or both of the touch screen display 220 and the onboard microphone 222 may perform the function of receiving a request to initiate an outgoing call or switch an active SIM call from using an onboard speaker/microphone to using a remote speaker/microphone or remote mobile communication device, or vise-versa. For example, the touch screen display 220 may receive a selection of a contact from a contact list, receive a telephone number for dialing, receive an indication whether to accept or decline an incoming call, or receive a user command to switch from using one microphone/speaker pair to another. As another example, the request to initiate the outgoing call or switch resources may be in the form of a voice command received via the onboard microphone 222, the onboard Bluetooth resource 226, or the onboard Wi-Fi resource 228. Interfaces may be provided between various software modules and functions in MSMA device 200 to enable communication between them, as is known in the art.

Figure 3:
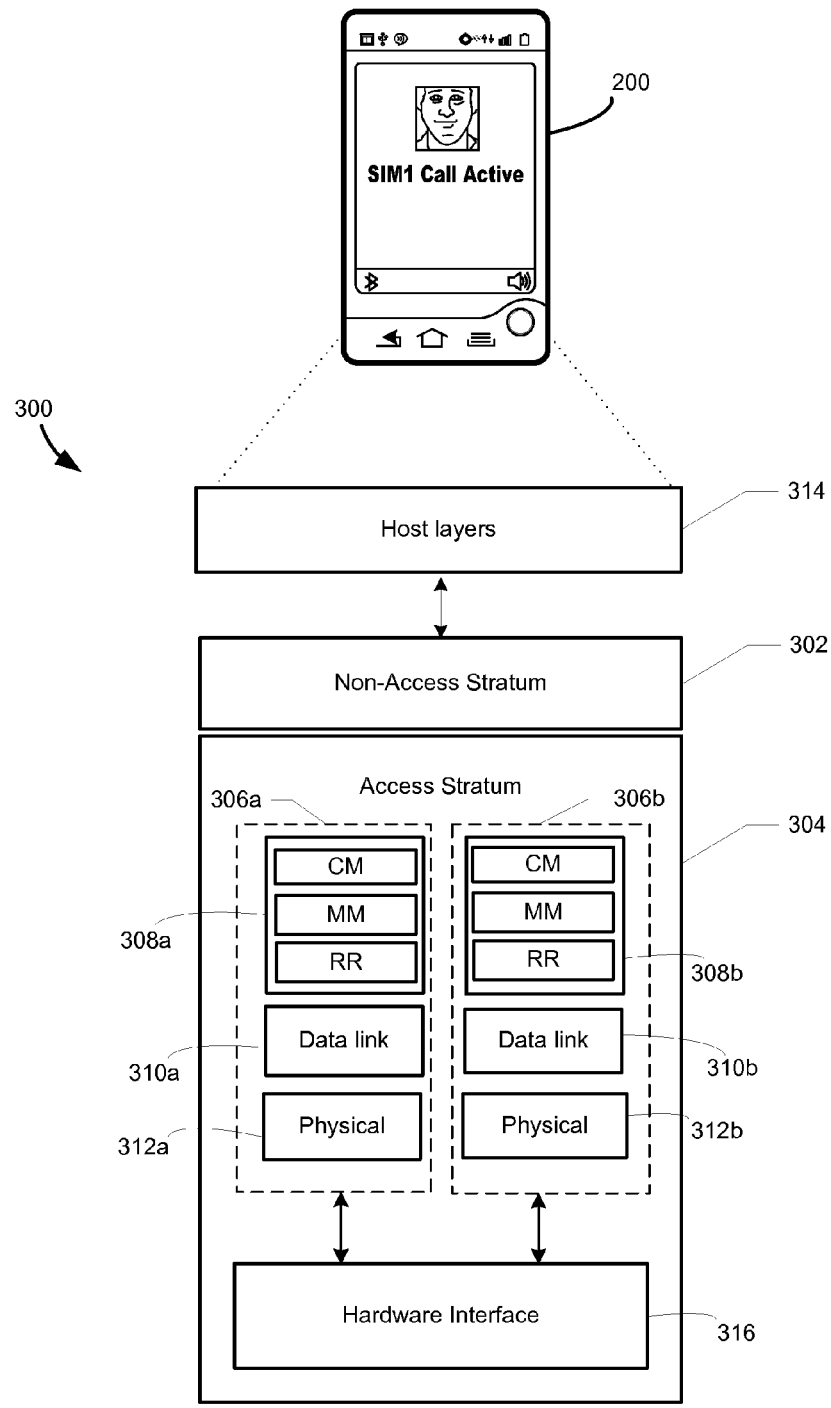
FIG. 3 is a system architecture diagram illustrating example protocol layers of modem stacks implemented by a MSMA device according to various embodiments.

FIG. 3 illustrates a software architecture 300 of the MSMA device 200 for communicating with radio access networks associated with SIMs. With reference to FIGS. 1-3, the software architecture 300 may be distributed among one or more processors (e.g., the general-purpose processor 210 or voice drivers 235, 245). The software architecture 300 may also include a Non Access Stratum (NAS) 302 and an Access Stratum (AS) 304. The NAS 302 may include functions and protocols to support traffic and signaling between SIMs of the MSMA device 200 (e.g., the first SIM 201, the second SIM 203 of FIG. 2) and their respective radio access networks. The AS 304 may include functions and protocols that support communication between the SIMs and entities of their respective access networks (such as an MSC, if in a GSM network).

In the MSMA device 200, the AS 304 may include multiple protocol stacks, each of which may be associated with a different SIM. The protocol stacks may be implemented to allow modem operation using information provisioned on multiple SIMs. Therefore, a protocol stack that may be executed by a baseband modem processor is interchangeably referred to herein as a modem stack.

In some embodiments, the AS 304 may include protocol stacks 306a, 306b, associated with SIMs (e.g., the first SIM 201, the second SIM 203), respectively. Although described below with reference to GSM-type communication layers, protocol stacks 306a, 306b may support any of variety of standards and protocols for wireless communications. The protocol stacks 306a, 306b may respectively include the signaling layers 308a, 308b for a mobile radio interface, which may each be implementations of Layer 3 of a GSM signaling protocol. Each of the signaling layers 308a, 308b may additionally include at least one sub-layer. For example, the connection management (CM) sub-layers may manage call control functions for circuit-switched communications in the network, such as establishing, maintaining and releasing call connections for communications. The CM sub-layer may also manage supplementary services and SMS communications.

Residing below the CM sub-layers in the signaling layers 308a, 308b, the mobility management (MM) sub-layers may support the mobility of user devices, and providing connection management services to the respective CM sub-layer functions arising from mobility of the user, as well as authentication and security. Example functions of the mobility management sub-layers may include provision of a MM connection, based on an existing radio resource connection, to the corresponding CM sub layer, location update procedures, and IMSI attach and detach procedures. Residing below the MM sub-layers, the radio resource management (RR) sub-layers may oversee the establishment of links between the MSMA device 200 and associated access networks, including management of the frequency spectrum, channel assignment and handover, power-level control, and signal measurements. In various embodiments, the NAS 302 and RR layers may perform the various functions to search for radio access networks and to establish, maintain and terminate calls.

Residing below the signaling layers 308a, 308b, the protocol stacks 306a, 306b may also include data link layers 310a, 310b, which may be part of Layer 2 in a GSM signaling protocol. The data link layers 310a, 310b may provide functions to handle incoming and outgoing data across the network, such as dividing output data into data frames and analyzing incoming data to ensure it has been successfully received. In some embodiments, each data link layer 310a, 310b may contain various sub-layers (e.g., media access control (MAC) and logical link control (LLC) layers (not shown)). Residing below the data link layers 310a, 310b, the protocol stacks 306a, 306b may also include physical layers 312a, 312b, which may establish connections over the air interface and manage network resources for the MSMA device 200.

While the protocol stacks 306a, 306b provide functions to transmit data through physical media, the software architecture 300 may further include at least one host layer 314 to provide data transfer services to various applications in the MSMA device 200. In some embodiments, application-specific functions provided by the at least one host layer 314 may provide an interface between the protocol stacks 306a, 306b and a processor (e.g., the general-purpose processor 210). In some embodiments, the protocol stacks 306a, 306b may each include one or more higher logical layers (e.g., transport, session, presentation, application, etc.) that provide host layer functions. In some embodiments, the software architecture 300 may further include in the AS 304 a hardware interface 316 between the physical layers 312a, 312b and the communication hardware (e.g., one or more RF transceivers).

Separate units of the baseband-modem processor 211 of the MSMA device 200 may be implemented as separate structures or as separate logical units within the same structure, and may be configured to execute software including at least two protocol/modem stacks associated with at least two SIMs, respectively. The SIMs and associated modem stacks may be configured to support a variety of communication services that fulfill different user requirements. Further, a particular SIM may be provisioned with information to execute different signaling procedures for accessing a domain of the radio access network associated with these services and for handling data thereof.

FIGS. 4A-4D illustrate a series of images on the touch screen display 220 of the MSMA device 200 (FIGS. 1-3) in accordance with various embodiments. A processor (e.g., 210 in FIG. 2) of the MSMA device may execute a software application for generating the images, which may provide information to the user and prompt the user for input through one or more input icons. While particular input icons and configurations on the touch screen display 220 are illustrated, other icons and/or configurations may be used in accordance with various embodiments. FIGS. 4A-4D illustrate examples of how a user may be notified of an incoming SIM call, while an earlier SIM call is in progress, and make a selection for selectively redirecting one of the calls in accordance with various embodiments.

With reference to FIGS. 1-4D, the touch screen display 220 includes an upper segment 410 that may provide information regarding one active SIM call, while a lower segment 420 may provide information regarding another active SIM call. The upper segment 410 may include a first call status indication 412 and a first caller detail region 414, which may include the caller's name, picture, or other useful information regarding the caller. The lower segment 420 may also include a second call status indication 422 and a second caller detail region 424. According to some embodiments, whichever of the two SIM calls was established first in time may occupy the upper segment 410 or the lower segment 420, which may be determined by a user preference setting. For ease of description, the term "first SIM call" (SIM1 Call) is used to refer to the earlier established call, and the term "second SIM call" (SIM2 Call) is used to refer to a later established call. A SIM call associated with either SIM may be the first or second SIM calls.

Figure 4A:
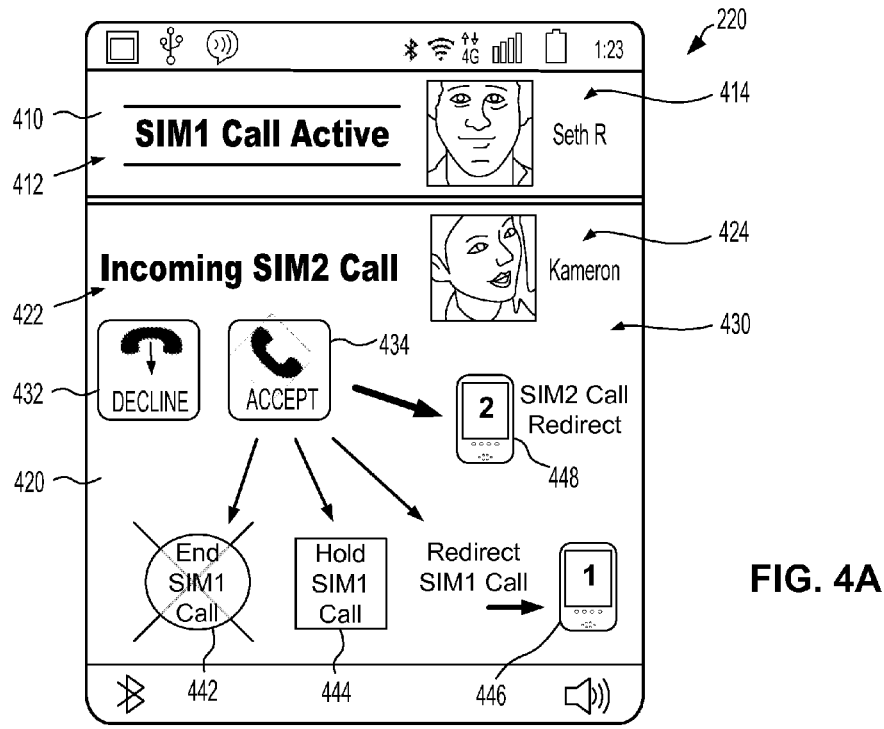
FIG. 4A is a screenshot of a touch screen display of a MSMA device receiving a second SIM call according to various embodiments.

FIG. 4A illustrates an incoming call user interface display 430 in the lower segment 420, which may be used to notify a user of a second SIM call while a first SIM call is in progress. The upper segment 410 shows "SIM1 Call Active," as the first call status indication 412, which provides a visual reminder to the user of details regarding the already established call. Additional information regarding the established call, such as elapsed time, may be included. The example incoming call user interface display 430 shows "Incoming SIM2 Call," as the second call status indication 422. In addition to providing information to the user, the incoming call user interface display 430 may prompt the user regarding the received second SIM call.

The two main user input prompts in the example illustrated in FIG. 4A are a DECLINE icon 432 and an ACCEPT icon 434. The user (e.g., 10 in FIG. 1) wishing to reject or not answer the second SIM call may either press/slide the DECLINE icon 432 (or the like) in which case the call my go to voicemail or other established call rejection routine. The user wishing the second SIM call to be established has various choices in how to establish the second SIM call because the first SIM call should also be handled. The first SIM call may be terminated and the second SIM call established by (but not limited to) sliding the ACCEPT icon 434 (or the like) to the End SIM1 Call icon 442 (or the like) or simply pressing either the ACCEPT icon 434 or the End SIM1 Call icon 442. The user may inform the third-party (e.g., 21) on the first SIM Call before doing so. Sliding the ACCEPT icon 434 to a Hold SIM1 Call icon 444 (or the like) or pressing the Hold SIM1 Call icon 444 may instruct the device processor to place the first SIM call on hold and direct the second SIM call to the default microphone/speaker pair of the MSMA device. The touch screen display 220 may provide the user with a further option to redirect either the first SIM call or the second SIM call to the second mobile communication device (e.g., 275 in FIG. 1) in accordance with various embodiments. In some embodiments, sliding the ACCEPT icon 434 to a Redirect SIM1 Call icon 446 (or the like) or pressing the Redirect SIM1 Call icon 446 may redirect the first SIM call. Alternatively, sliding the ACCEPT icon 434 to a SIM2 Call Redirect icon 448 (or the like) or pressing the SIM2 Call Redirect icon 448 may instruct the device processor to redirect the second SIM call. In either case, the non-redirected SIM call may be established or maintained using the default microphone/speaker pair of the MSMA device.

Figure 4B:
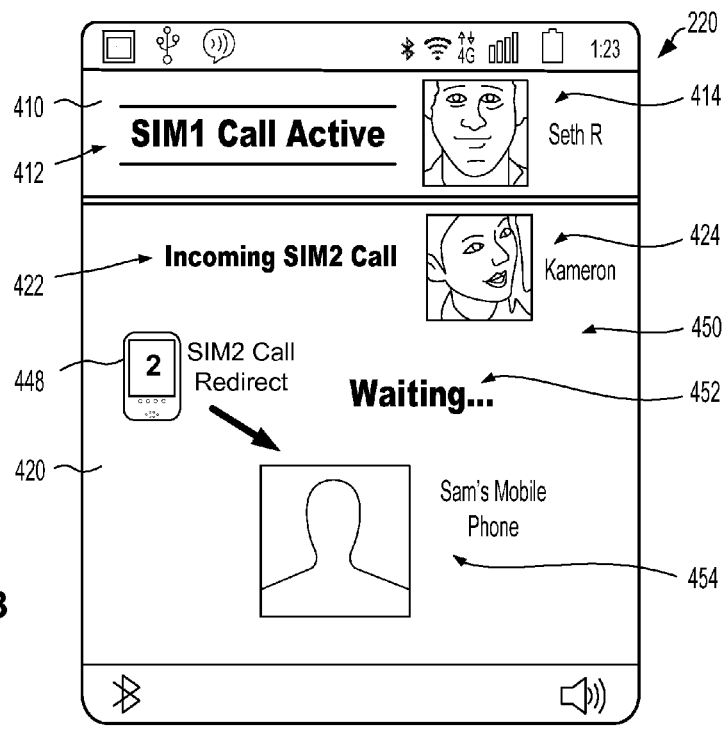
FIG. 4B is a screenshot of a touch screen display of a MSMA device redirecting a second SIM call according to various embodiments.

FIG. 4B illustrates a SIM2 call redirect user interface display 450 in the lower segment 420. The user (e.g., 10 in FIG. 1) has elected to redirect the second SIM call to "Sam's Mobile Phone," which is a default second mobile communication device (e.g., 275 in FIG. 1) for receiving redirected calls. In some embodiments, an intermediate user interface display may be provided allowing the user to either pair with the second mobile communication device or select from a list of already paired devices. The example SIM2 Call Redirect icon 448 (or the like) may provide a visual reminder of what was selected on the previous screen. In addition, a redirect status indication 452 (or the like) may optionally be provided if the user elected to redirect the call to the second mobile communication device and doing so takes more than a second or two. The second mobile communication device may receive the redirected call similar to a traditional phone call (e.g., with a default ring-tone signaling that the user should press a user interface button or icon to "answer" the call) or immediately receive the call in a push-to-talk mode. Also, a second mobile communication device detail region 454 (or the like) may remind the user, to which second mobile communication device the SIM call is being redirected.

Figure 4C:
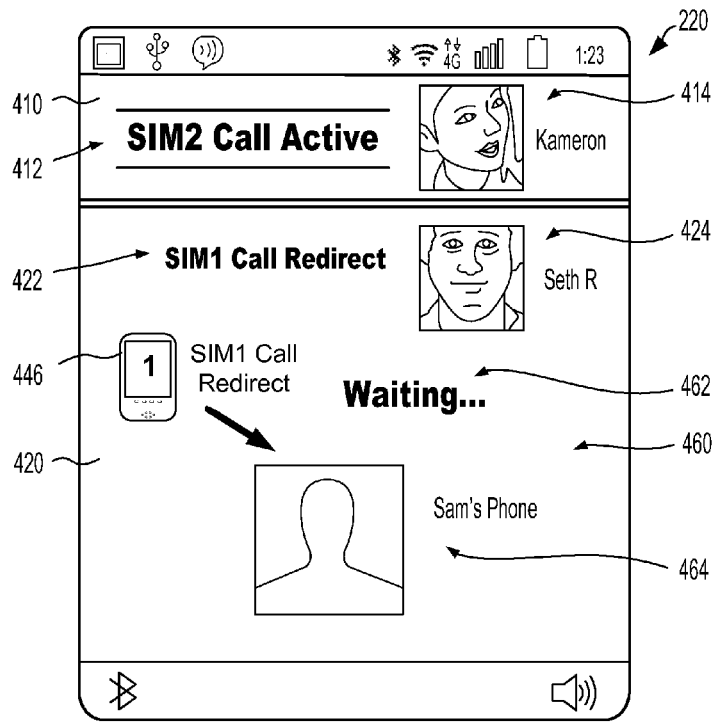
FIG. 4C is a screenshot of a touch screen display of a MSMA device redirecting a first SIM call according to various embodiments.

FIG. 4C illustrates a SIM1 call redirect user interface display 460 in the lower segment 420. This display is an example of an alternative redirect option according to some embodiments. In the example illustrated in FIG. 4C, the user (e.g., 10 in FIG. 1) has elected to redirect the first SIM call to "Sam's Mobile Phone," while receiving the second SIM call on the microphone/speaker pair of the MSMA device (e.g., 222, 224 in FIG. 2). The first call status indication 412 is updated to read, "SIM2 Call Active," to reflect the call that is connected to the speaker and microphone of the MSMA device. Similarly, the second call status indication 422 is updated to read, "SIM1 Call Redirect." In some embodiments, an intermediate user interface display may be provided to allow the user to either pair with the second mobile communication device (e.g., 275 in FIG. 1) or select from a list of already paired devices. The example Redirect SIM1 Call icon 446 may provide a visual reminder of the selection that was made on the previous screen. In addition, a redirect status indication 462 (or the like) may be provided if the user elected to redirect the call to the second mobile communication device and doing so takes more than a second or two. Information regarding the second mobile communication device may also be included in a detail region 464 (or the like).

Figure 4D:
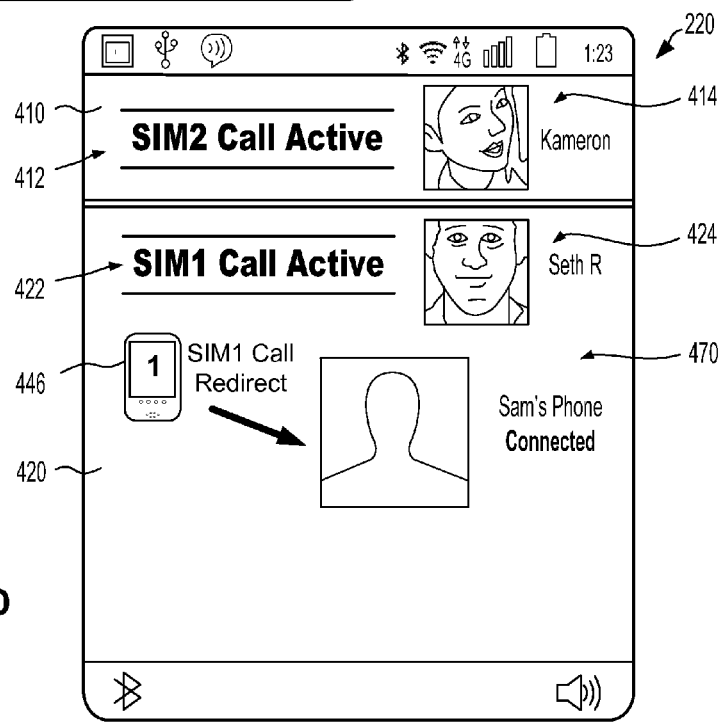
FIG. 4D is a screenshot of a touch screen display of a MSMA device handling two active voice calls according to various embodiments.

FIG. 4D illustrates a successful redirect connection user interface display 470 in the lower segment 420, which may follow the SIM1 call redirect user interface display 460 (e.g., as illustrated in FIG. 4C). Once the second mobile communication device has answered the call, the redirected SIM call may be maintained active, and the user may be informed by the first call status indication 412, which may include a display such as "SIM2 Call Active." Similarly, the second call status indication 422 may read "SIM1 Call Active." The redirected call may remain active until the call is terminated, by the third-party, the main user, the secondary user, a technical or reception problem, or otherwise.

FIGS. 5-8 illustrate communication flows in four different scenarios of how simultaneous calls may be handled on the MSMA device 200 (FIGS. 1-3) in accordance with various embodiments. The various scenarios refer to particular onboard resources of the MSMA device 200, as well as the second mobile communication device 275 (FIG. 1). With reference to FIGS. 1-8, the onboard resources may include the general-purpose processor (processor) 210, the touch screen display 220, the onboard microphone/speaker 222, 224, the onboard Bluetooth transceiver 227 (referred to as the "third transceiver 227"), the first access network transceiver 260 (referred to as the "first transceiver 260"), and the second access network transceiver 270 (referred to as the "second transceiver 270"). The second mobile communication device 275 may be configured to be paired with the MSMA device 200 and communicate with the MSMA device 200 via the third transceiver 227. The third transceiver 227 may be a Bluetooth transceiver, a Wi-Fi transceiver (e.g., the onboard Wi-Fi transceiver 229), or a transceiver using another technology or protocol.

References to SIM calls, SIMs, radios, output devices, transceivers, and antennas as "first" and "second" are merely for ease of the description. Thus, an established voice call may be referred to as the "first SIM call" associated with a "first SIM" and a "first transceiver" that is output on a "first speaker" to distinguish that call from a subsequently connected voice call ("second SIM call") associated with a "second SIM" and a "second transceiver" that is output on a "second speaker." Calls may be established using services associated with each SIM in any order, and therefore references to "first" and "second" are not intended to limit the scope of the claims to any order or particular association.

In the illustrated scenarios, a first SIM call may be established before a second SIM call is established, and both of the SIM calls may be maintained active simultaneously. Any SIM (e.g., 201, 203, 205, 207) may support the first established SIM call, and any other SIM may support the second established SIM call, so the terms "first SIM call" and "second SIM call" refer only to the order in which the calls were established. In the illustrated scenarios, the call signaling and communication streams are referred to with different reference numbers as they are transmitted to or received from the second mobile communication device 275, regardless of whether there are any substantial changes in the signaling or communication streams. In addition, in the individual scenarios different reference numerals indicate communication streams in opposite directions (i.e., one reference numeral for signals received from the radio access network, such as 110, 120, and another reference numeral for signals transmitted to the radio access network).

Figure 5:
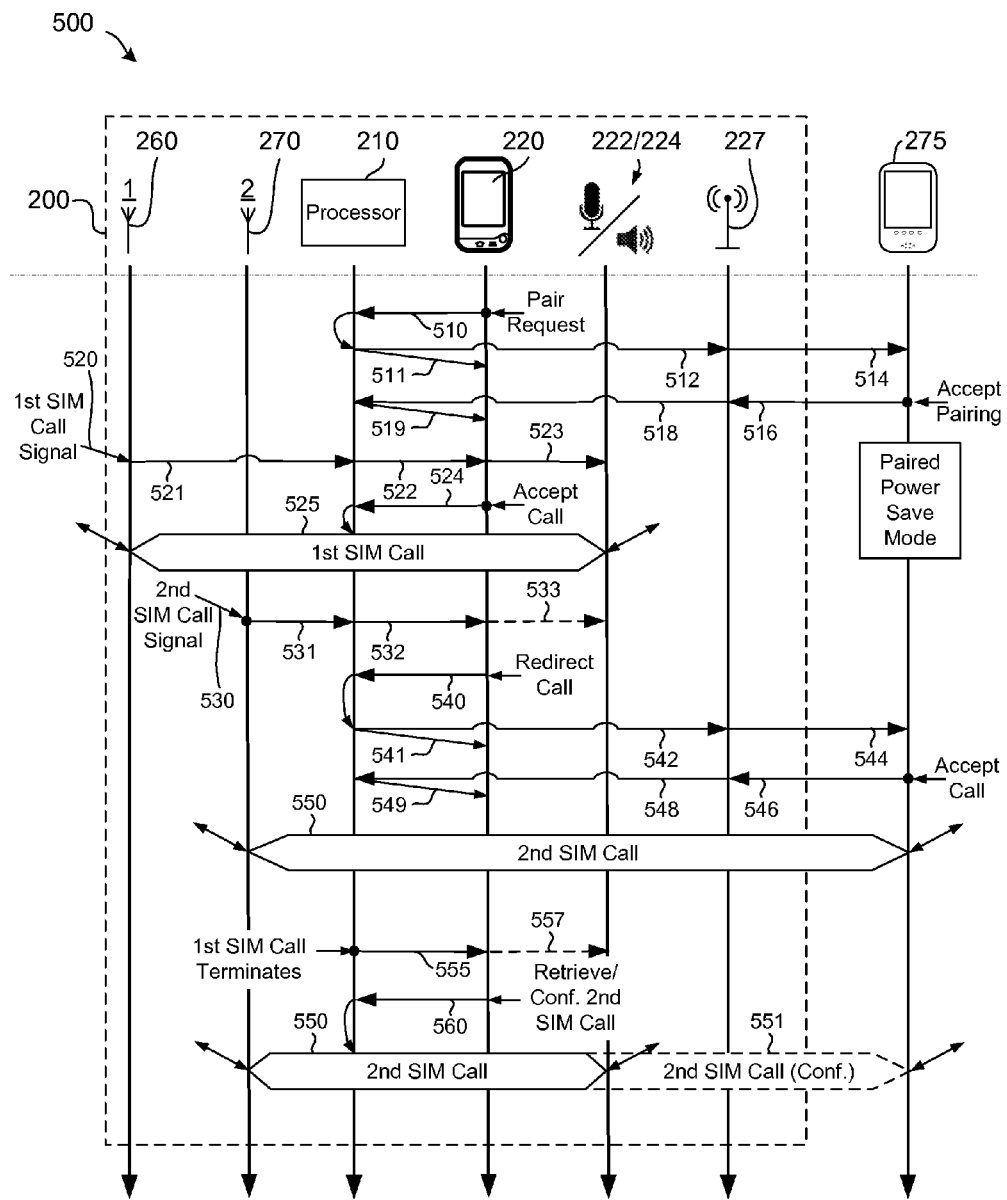
FIG. 5 is a communication flow diagram illustrating a method of handling simultaneous calls on a mobile communication device according to various embodiments.

FIG. 5 illustrates signal flows 500 when two SIM calls are simultaneously handled by the MSMA device 200, with one call relayed to the second mobile communication device 275 in accordance with some embodiments. With reference to FIGS. 1-5, the signal flows 500 illustrate how a second SIM call 550 may be received and maintained active by relaying its output to second mobile communication device 275 via a wireless link, while also maintaining a first SIM call 525 active. Initially, after pairing with the second mobile communication device 275, the first SIM call 525 may be established using the onboard microphone/speaker 222, 224. In response to receiving a second SIM call signal 530, the processor 210 may maintain both the first and second SIM calls 525, 550 active, by connecting the second SIM call 550 to the second mobile communication device 275.

The processor 210 of the MSMA device 200 may receive a pair request 510 entered by the main user (e.g., 10) interacting with the touch screen display 220, and initiate a pairing routine in response. The processor 210 may send a status update 511 to the touch screen display 220 while the processor 210 transmits an internal pairing signal 512 to the third transceiver 227. For example, using an onboard Bluetooth resource and Bluetooth transceiver, the processor 210 may transmit a hands-free profile capability inquiry for the third transceiver 227 to forward using a Bluetooth link. More generally, the third transceiver 227 may convey an external pairing signal 514 to the second mobile communication device 275.

When a secondary user or anyone handling the second mobile communication device 275 accepts the pair request, an external pairing acceptance signal 516 may be transmitted back to the third transceiver 227, which may pass an internal pairing acceptance signal 518 to the processor 210. For example again in a Bluetooth environment, the internal and external pairing acceptance signals 516, 518 may indicate the second mobile communication device 275 may support the hands-free second transceiver Bluetooth profile. In addition, while the second mobile communication device 275 is not actively communicating with the MSMA device 200, the paired communications may be placed in a paired power save mode for conserving power. The processor 210 may send another status update 519 to the touch screen display 220 to advise the user of the MSMA device 200 that the second mobile communication device 275 is successfully paired. Such a pairing routine may optionally be automatic when the MSMA device 200 and the second mobile communication device 275 are in range of one another and have their respective direct wireless link transceivers (i.e., the third transceiver 227 of the MSMA device 200) powered-on.

In various embodiments, the pairing routine may establish a Bluetooth server-client pairing between a MSMA device and a second mobile communication device. The Bluetooth server-client pairing may use a Bluetooth profile providing a direct audio stream connection between the MSMA device 200 and a remote mobile communication device, such as the second mobile communication device 275. A Bluetooth wireless link may enable a first SIM call received by the MSMA device 200 to the second mobile communication device 275, while a second SIM call is simultaneously active on the MSMA device 200 itself. For example, a version of the Android® operating system for mobile communication devices, version 4.3 (also known as, "Jelly Bean MR2"), offers features using Bluetooth low energy. Jelly Bean MR2 allows two mobile communication devices to connect with Bluetooth, such that one mobile communication device functions as a server and the other mobile communication device functions as a client using a hands-free profile (HFP). The HFP is a standard adopted by the Bluetooth Special Interest Group (SIG) generally used by mobile communication devices to communicate with hands-free peripheral devices, such as wireless earpieces or headsets.

In some embodiments, the pairing routine may alternatively or additionally establish a direct wireless link using a Wi-Fi data connection. For example, Wi-Fi Direct may provide a direct wireless link enabling devices to connect with each other without requiring a wireless access point and to communicate everything from file transfer to Internet connectivity. Wi-Fi Direct is a Wi-Fi standard that enables devices to connect wirelessly even if they are from different manufacturers. Only one of the Wi-Fi devices needs to be compliant with Wi-Fi Direct to establish a peer-to-peer connection that transfers data directly between each other. The "pairing" of Wi-Fi Direct devices can be set up to require the proximity of a near field communication, a particular signal, or a button press on one or all the devices. Wi-Fi Direct may not only replace the need for routers, but may also replace the need for a Bluetooth transceiver.

After pairing, the first transceiver 260 may receive the first SIM call signal 520, which may be conveyed as a first incoming call signal 521 to the processor 210. As with a conventional incoming call received on the MSMA device 200, the processor 210 may transmit an incoming call indication 522 to the touch screen display 220, as well as a first ring-tone 523 to the onboard speaker 224 (if not muted). Other incoming call indicators, such as vibrations, may optionally be used. Whether the first SIM call 525 is an incoming call or an outgoing call, the first SIM call 525 may be with the first radio access network (e.g., 110) using information stored in the first SIM (e.g., 201) of the MSMA device 200. In response to the processor 210 receiving a call acceptance user input 524, the first SIM call 525 may be established with a communication feed established between the first transceiver 260 and the onboard microphone/speaker 222, 224. The onboard microphone 222 may capture and send transmission signals to the first transceiver 260 for transmission to the first radio access network as part of the first SIM call 525. In addition, signals received at the first transceiver 260 relating to the first SIM call 525 may be communicated to the onboard speaker 224 for output to the main user. The processor 210 may also transmit one or more first call updates to the touch screen display 220 regarding the status of the call or other information associated with the first SIM call 525.

The second transceiver 270 may receive a second SIM call signal 530, which may be conveyed as a second incoming call signal 531 to the processor 210. In response, the processor 210 may provide an incoming call indication 532 to the touch screen display 220. The incoming call indication 532 is a way of prompting the main user regarding the received second SIM call signal 530. In some embodiments, such as when the MSMA device 200 is set to provide audio alerts for incoming calls (i.e., the onboard speaker 224 is not in silence or vibration modes), the processor 210 may send a second ring-tone 533 to the onboard speaker 224. The second ring-tone 533, which may be audible, may be disruptive when the first SIM call 525 is in progress and actively using the onboard microphone/speaker 222, 224, so in some embodiments, a silent (i.e., visual and/or haptic) indication of the incoming call may be generated even when the device is not in silence mode.

The main user interacting with the touch screen display 220 may accept and redirect the second SIM call 550 to the second mobile communication device 275, such as by touching a displayed icon (e.g., the SIM2 Call Redirect icon 448). In this manner, the processor 210 may receive a call redirect indication 540. The call redirect indication 540 may reflect the input from the main user regarding simultaneously maintaining active the first SIM call 525 and the second SIM call 550, and designating one of the MSMA device 200 and the second communication device 275 to handle the second SIM call 550. The processor 210 may send another status update 541 to the touch screen display 220 (e.g., the display in FIG. 4B) and transmit an internal redirected call signal 542 to the third transceiver 227. The third transceiver 227 may convey an external redirected call signal 544 to the second mobile communication device 275. The second mobile communication device 275 may output its own audible call alert (e.g., a ring tone or a custom output indicating it is a redirected call vs. an ordinary incoming call) to inform the secondary user (e.g., 15) that the second SIM call 550 is being redirected to second mobile communication device 275.

When the secondary user or anyone handling the second mobile communication device 275 accepts the redirected call, an external redirected call acceptance signal 546 may be transmitted back to the third transceiver 227, which may pass an internal redirected call acceptance signal 548 to the processor 210. In some embodiments, additional audio connection setup signals may be exchanged between the MSMA device 200 and the second mobile communication device 275 prior to and/or after the exchange of the external redirected call signal 544 and the external redirected call acceptance signal 546. In addition, more than one of the internal and external redirected call signals 542, 544 may be transmitted, such that each of the internal and external redirected call signals 542, 544 correspond to a ring-tone or alert at the second mobile communication device 275.

In response to receiving the internal redirected call acceptance signal 548, the processor 210 may send a second SIM call status update 549 to the touch screen display 220 to advise the main user that the second mobile communication device 275 has accepted (i.e., answered) the second SIM call 550. In addition, the processor 210 may establish the second SIM call 550 with the corresponding second radio access network (e.g., 120), routing signals to and receiving signals from the third transceiver 227. In this manner, the processor 210 may ensure that signals received by the third transceiver 227 from the second mobile communication device 275 are transferred as transmission signals to the second transceiver 270 for transmission to the second radio access network. In addition, signals received at the second transceiver 270 corresponding to the second SIM call 550 may be transferred to the third transceiver 227 and conveyed as output signals for output to the secondary user by the second mobile communication device 275.

In some embodiments, in response to termination of either of the first SIM call 525 or the second SIM call 550, the main user may be prompted on a user interface with an option to redirect the non-terminated call to either the MSMA device 200 or the second communication device 275. This may enable the main user to have the option of establishing a communication feed between the second transceiver 270 and the onboard microphone/speaker 222, 224 (i.e., the input/output device of the MSMA device 200) when the first SIM call 525 ends while the second SIM call 550 remains active. Similarly, in response to termination of the second SIM call 550 while the first SIM call 525 is still active, the main user may be given the option to establish a communication feed between the first transceiver 260 and the second communication device 275 via a direct wireless link using the third transceiver 227. In response to one of the first SIM call 525 and the second SIM call 550 terminating, the main user may be prompted for an input regarding whether the user wants to maintain the other call (i.e., the call that was not terminated) active. In some embodiments, in response to one of the first SIM call 525 and the second SIM call 550 terminating, the other (i.e., non-terminated) call may be maintained active as a conference call upon the main user's election, with the call continuing on both the onboard microphone/speaker 222, 224 of the MSMA device 200 and the second communication device 275 via the direct wireless link using the third transceiver 227.

In response to the first SIM call 525 terminating, the processor 210 may send a call termination indication 555 to the touch screen display 220 to advise the main user of this event and provide the user with input options for managing the second SIM call (if active). In some embodiments, the processor 210 may also send an audible tone 557 to the onboard speaker 224. As the second SIM call 550 may still be in progress, the call termination indication 555 and/or the audible tone 557 may remind the main user that the second SIM call 550 is being handled via the direct wireless link via the third transceiver 227. With the first SIM call 525 terminated, the main user may wish to retrieve the second SIM call 550 or establish a conference call with the second SIM call 550. Retrieving the second SIM call may establish a communication feed between the second transceiver 270 and the onboard microphone/speaker 222, 224. Establishing the conference call with the second SIM call may maintain the second SIM call 550 active using both the onboard microphone/speaker 222, 224 and the second communication device 275 via the third transceiver 227 using the direct wireless link. The processor 210 may receive a post-call termination input 560 from the main user, and reconfigure the second SIM call 550 locally or as a conference call 551 depending on the input from the main user.

Figure 6:
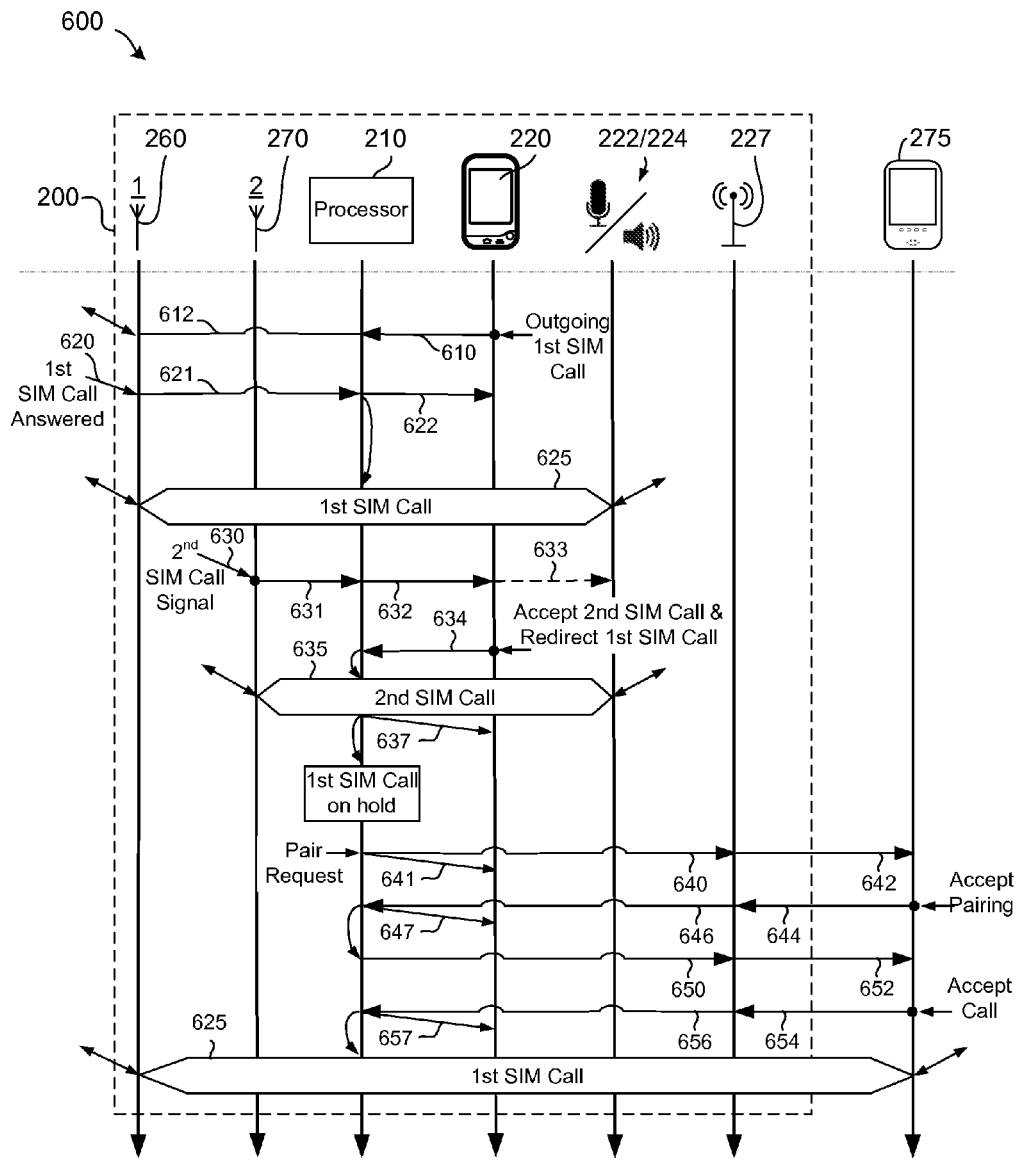
FIG. 6 is a communication flow diagram illustrating another method of handling simultaneous calls on a mobile communication device according to various embodiments.

FIG. 6 illustrates signal flows 600 for simultaneous SIM calls handled by the MSMA device 200 in which the main user (e.g., 10 in FIG. 1) initiates an outgoing first SIM call, which becomes the first SIM call 625, then redirects the first SIM call 625 to the second mobile communication device 275 before answering a second SIM call signal 630 on the MSMA device 200. In the scenario illustrated in FIG. 6, a pairing routine is performed after the second SIM call 635 is received and established.

With reference to FIGS. 1-6, when the main user initiates an outgoing call using the touch screen display 220 (or the like), a call initiation signal 610 may be received by the processor 210. The processor 210 may in turn perform several operations using protocols and information from the first SIM (e.g., 201) to establish the first SIM call 625, including transmitting an outgoing call signal 612 (i.e., initiating the first SIM call 625) to the first transceiver 260 for transmission to the first radio access network (e.g., 110). When the first third-party (e.g., 21) answers the first SIM call 625, the processor 210 may receive an incoming answer signal 621 from the first transceiver 260 in response to the first transceiver 260 receiving a first SIM call answered signal 620 from the first radio access network. The processor 210 may transmit an answered call indication 622 to the touch screen display 220 and establish the first SIM call 625. The first SIM call 625 may be maintained active with a communication feed established between the first transceiver 260 and the onboard microphone/speaker 222, 224. With the first SIM call 625 established in this manner, the onboard microphone 222 may capture and send transmission signals to the first transceiver 260 for transmission to the first radio access network as part of the first SIM call 625, and signals received at the first transceiver 260 relating to the first SIM call 625 may be communicated to the onboard speaker 224 for output to the main user.

The second transceiver 270 may receive a second SIM call signal 630, which may be conveyed as a second incoming call signal 631 to the processor 210. In response, the processor 210 may provide an incoming call indication 632 to the touch screen display 220. In some embodiments, the processor 210 may send a second SIM call ring-tone 633 signal or other output associated with an incoming call to the onboard speaker 224. The main user interacting with the touch screen display 220 may accept the second SIM call 635, but choose to redirect the first SIM call 625 to the second mobile communication device 275 by touching a displayed icon (e.g., the Redirect SIM1 Call icon 446). Having accepted the second SIM call 635, the processor 210 may immediately establish the second SIM call 635. The processor 210 may receive an acceptance/redirect input 634 reflecting the main user's choice for handling the first SIM call 625 and the second SIM call 635. The second SIM call 635 may be maintained active with a communication feed established between the second transceiver 270 and the onboard microphone/speaker 222, 224. In this way, the onboard microphone 222 may capture and send transmission signals to the second transceiver 270 as part of the second SIM call 635, and signals received at the second transceiver 270 relating to the second SIM call 635 may be communicated to the onboard speaker 224 for output to the main user. The processor 210 may also send another status update 637 to the touch screen display 220 (e.g., the display in FIG. 4C) while the processor 210 also places the first SIM Call 625 on hold.

Meanwhile, with no second mobile communication device 275 paired or available, the processor 210 may initiate a pairing routine for redirecting the first SIM call 625. The pairing routine may include the processor 210 sending a status update 641 to the touch screen display 220 while transmitting an internal pairing signal 640 to the third transceiver 227. The third transceiver 227 may convey an external pairing signal 642 to the second mobile communication device 275. When the secondary user or anyone handling the second mobile communication device 275 accepts the pair request, an external pair acceptance signal 644 may be transmitted back to the third transceiver 227, which may pass an internal pair acceptance signal 646 to the processor 210. The processor 210 may send another status update 647 to the touch screen display 220 to advise the main user that the second mobile communication device 275 is paired successfully.

As this pairing routine may coincide or immediately precede an audio connection setup between the MSMA device 200 and the second mobile communication device 275, an additional audio connection setup exchange may occur after the pairing routine is successful. Once the MSMA device 200 and the second mobile communication device 275 are paired and ready for audio exchanges, the processor 210 may transmit one or more internal incoming call signals 650 to the third transceiver 227. The third transceiver 227 in turn may convey corresponding external incoming call signals 652 to the second mobile communication device 275.

When the secondary user (e.g., 15) or anyone handling the second mobile communication device 275 accepts the incoming call, an external call acceptance signal 654 may be transmitted back to the third transceiver 227, which may pass an internal call acceptance signal 656 to the processor 210. The processor 210 may send another status update 657 to the touch screen display 220 (e.g., the display in FIG. 4D) to advise the user of the MSMA device 200 that the second mobile communication device 275 has accepted the incoming call and the first SIM call 625 is no longer on hold. The processor 210 may release the hold on the first SIM call 625 with its corresponding first radio access network, and begin routing audio signals to and receiving signals from the third transceiver 227. In this way, the processor 210 may communicate signals received by the third transceiver 227 from the second mobile communication device 275 to the first transceiver 260 for transmission to the first radio access network, and communicate signals received from the first transceiver 260 corresponding to the first SIM call 625 to the third transceiver 227 for transmission as output signals to the second mobile communication device 275.

Figure 7:
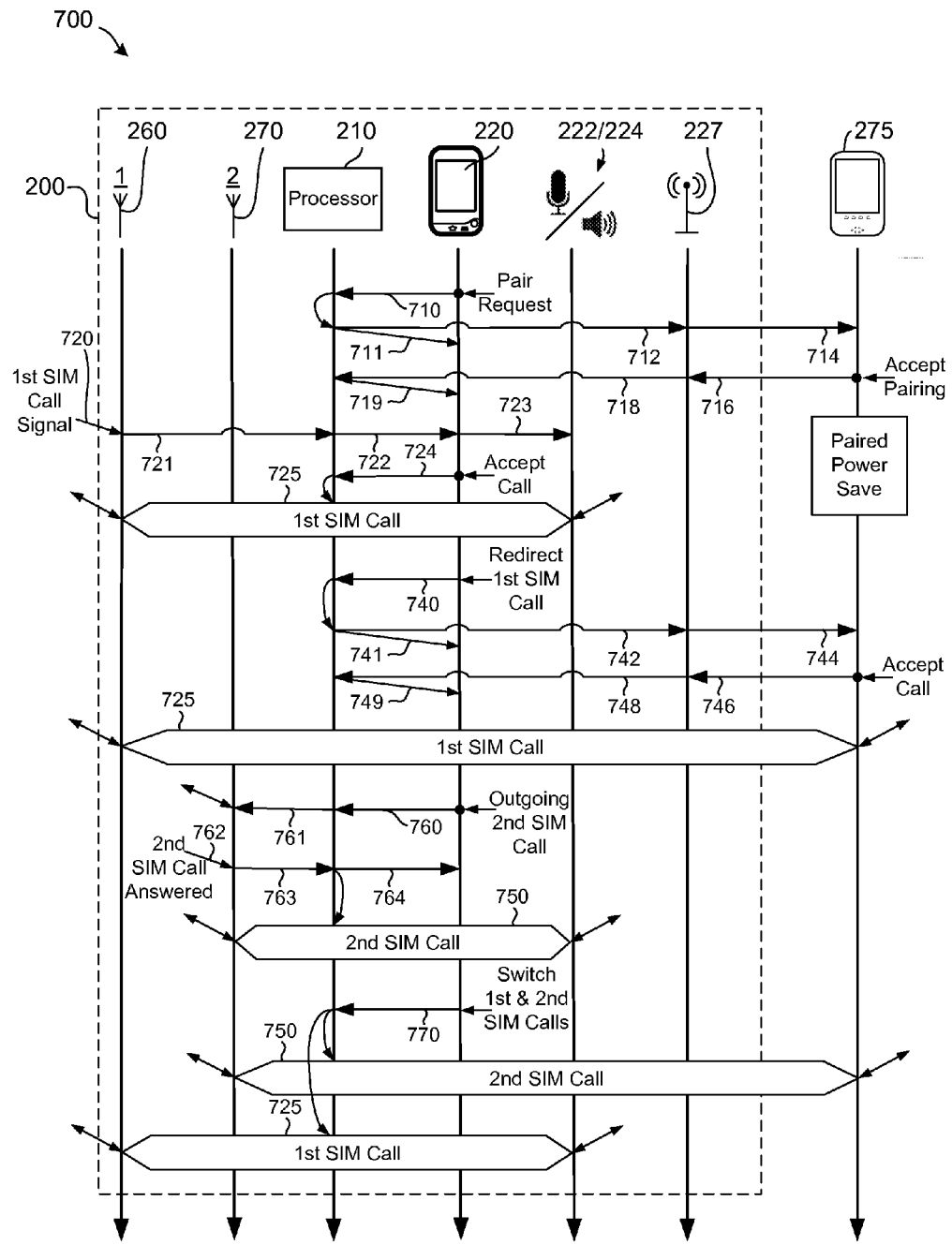
FIG. 7 is a communication flow diagram illustrating yet another method of handling simultaneous calls on a mobile communication device according to various embodiments.

FIG. 7 illustrates signal flows 700 according to various embodiments for simultaneous SIM calls handled by a MSMA device (e.g., 200) in which the first SIM call is initially established using the onboard microphone/speaker 222, 224, then switched to using the second mobile communication device 275 so that the onboard microphone/speaker 222, 224 may be used for making a second outgoing SIM call, after which the outputs of the first and second SIM calls are switched again.

With reference to FIGS. 1-7, the processor 210 may initially receive a pair request 710 entered by the main user (e.g., 10) interacting with the touch screen display 220, which initiates the pairing routine. The processor 210 may send a status update 711 to the touch screen display 220 and transmit an internal pairing signal 712 to the third transceiver 227. The third transceiver 227 may convey an external pairing signal 714 to the second mobile communication device 275. When the secondary user (e.g., 15) or anyone handling the second mobile communication device 275 accepts the pair request, an external pair acceptance signal 716 may be transmitted back to and received by the third transceiver 227, which may pass an internal pair acceptance signal 718 to the processor 210. In addition, while the second mobile communication device 275 is not actively communicating with the MSMA device 200, paired communications processes of the second mobile communication device 275 may be placed in a paired power save mode for conserving power. The processor 210 may send another status update 719 to the touch screen display 220 to advise the main user of the MSMA device 200 that the second mobile communication device 275 is successfully paired.

Subsequently, the processor 210 may receive an incoming first SIM call signal 721, in response to the first transceiver 260 receiving a first SIM call signal 720 from the first radio access network (e.g., 110). The processor 210 may transmit an incoming call indication 722 to the touch screen display 220, as well as a incoming first SIM call ring-tone 723 to the onboard speaker 224 (if not muted). The first SIM call 725 may be communicated from the first radio access network. When the processor 210 receives a call accept signal 724 in response to a call accept input from the main user, the processor 210 may establish the first SIM call 725 using the first transceiver 260 and the onboard microphone/speaker 222, 224.

With the first SIM call 725 established, the main user may enter a call redirect user input 740, directing the processor 210 to redirect the first SIM call 725, in preparation for initiating another call using the second SIM (e.g., 203). The processor 210 may send another status update 741 to the touch screen display 220 while the processor 210 transmits an internal redirected call signal 742 to the third transceiver 227. The third transceiver 227 may convey an external redirected call signal 744 to the second mobile communication device 275. When the secondary user or anyone handling the second mobile communication device 275 accepts the redirected first SIM call, an external redirected call acceptance signal 746 may be transmitted back to the third transceiver 227, which may pass an internal redirected call acceptance signal 748 to the processor 210. In response to receiving the internal redirected call acceptance signal 748, the processor 210 may send a first SIM call status update 749 to the touch screen display 220 to advise the main user of the MSMA device 200 that the second mobile communication device 275 has accepted the first SIM call 725. In addition, the processor 210 may reestablish the first SIM call 725 with a communication feed between the first transceiver 260 and the second communication device 275 via the third transceiver 227. Signals received by the third transceiver 227 from the second mobile communication device 275 may be transferred as transmission signals to the first transceiver 260 for transmission to the first radio access network, and signals received by the first transceiver 260 corresponding to the first SIM call 725 may be transferred to the third transceiver 227 and conveyed as output signals for output to the secondary user by the second mobile communication device 275.

After switching and reestablishing the first SIM call 725 using the second mobile communication device 275, an outgoing call user input 760 may be received by the processor 210 from the touch screen display 220 to initiate an outgoing call, such as a telephone number to dial or a selection of a contact to call. In response, the processor 210 may transmit an outgoing call signal 761 (i.e., initiating the second SIM call) to the second transceiver 270 for transmission to the second radio access network (e.g., 120). Once the third-party (e.g., 22) receives and answers the second SIM call 750, the second transceiver 270 may receive a second SIM call answered signal 762, which the second transceiver 270 may transmit as an incoming second SIM call answer signal 763 to the processor 210. The processor 210 may then transmit an answered call indication 764 to the touch screen display 220 and establish the second SIM call 750 using the second transceiver 270 and the onboard microphone/speaker 222, 224.

With the first SIM call 725 and the second SIM call 750 are established and active, the main user may initiate a swap of devices handling the simultaneous calls. For example, a call switch input entered at the touch screen display 220 may result in a call switch indication 770 received by the processor from the touch screen display 220 that causes the processor 210 to redirect the input/output for the second SIM call 750 to the second mobile communication device 275 via the third transceiver 227, and begin using the onboard microphone/speaker 222, 224 pair of the MSMA device 200 for the first SIM call 725.

Figure 8:
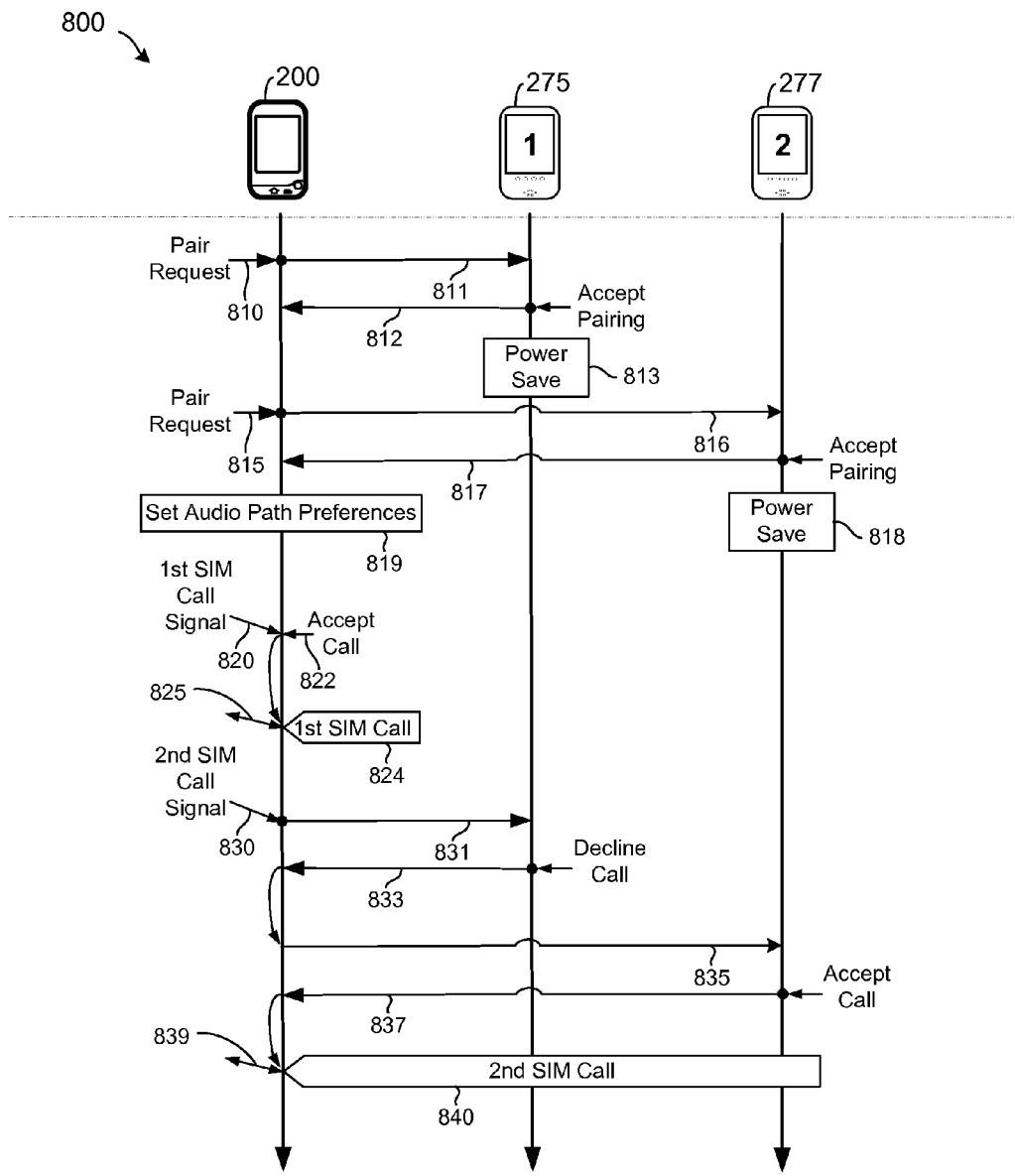
FIG. 8 is a communication flow diagram illustrating a further method of handling simultaneous calls on a mobile communication device according to various embodiments.

FIG. 8 illustrates a communication flow 800 for a scenario of simultaneous SIM call handling on a MSMA device in accordance with various embodiments. With reference to FIGS. 1-8, the communication flow 800 illustrates pairing with multiple mobile communication devices and using at least one of these devices for simultaneously handling two SIM calls. After an initial pairing of two mobile communication devices and establishing the first SIM call using the onboard microphone/speaker 222, 224, the second mobile communication device 275 declines a second SIM call 840 before a third mobile communication device 277 accepts the second SIM call 840. The internal call flow elements within the MSMA device 200 are not shown for the sake of brevity, and only the signaling between the MSMA device 200, the second mobile communication device 275 and the third mobile communication device 277 are described.

A pair request 810 may be entered by the main user (e.g., 10) interacting with the MSMA device 200, which initiates a first pairing routine. The MSMA device 200 may send a first pairing signal 811 (first pair request) to the second mobile communication device 275. When the secondary user (e.g., 15) or anyone handling the second mobile communication device 275 accepts the first pair request, a first pair acceptance signal 812 may be transmitted back to the MSMA device 200. While the second mobile communication device 275 is not actively communicating with the MSMA device 200, paired communications processes of the second mobile communication device 275 may be placed in a paired power save mode 813 for conserving power.

If the main user desires and the third mobile communication device 277 is available, the pairing routine may be repeated to pair the MSMA device 200 with the third mobile communication device 277. The main user may enter a second pair request 815 to initiate the second pairing routine. The processor 210 of the MSMA device 200 may similarly send a second pairing signal 816 (second pair request) to the third mobile communication device 277. When the second third-party 22 or anyone handling the third mobile communication device 277 accepts the second pair request, a second pair acceptance signal 817 may be transmitted back to the MSMA device 200. While the third mobile communication device 277 is not actively communicating with the MSMA device 200, paired communications processes of the second mobile communication device 275 may be placed in a paired power save mode 818 for conserving power. After the successful pairing routines, the second mobile communication device 275 or the third mobile communication device 277 may be used for handling two SIM calls. The processor (e.g., 210) may set an audio path preference 819 for the MSMA device 200. The audio path preference 819 may be automatically set with default settings corresponding to the pairing order, set in response to received input from the main user, or set from other inputs or processes.

After pairing, the MSMA device 200 may receive a first SIM call signal 820 corresponding to what will become a first SIM call 824. The incoming call may trigger visual and audio indications, such as a ring-tone, in the MSMA device 200. Whether the first SIM call 824 is an incoming call or an outgoing call, the first SIM call 824 may be from or with the first radio access network (e.g., 110) in a conventional manner. The main user of the MSMA device 200 may press or otherwise operate an "Accept" icon, button, or the like to accept 822 the first SIM call 824. The first SIM call 824 may then be established by connecting the first transceiver (e.g., 260) to the first radio access network for transmitting and receiving signals 825, with the input/output of the first SIM call 824 being handled by the onboard microphone/speaker (e.g., 222, 224) of the MSMA device 200.

The MSMA device 200 may receive a second SIM call signal 830 corresponding to a second SIM (e.g., 203) of the MSMA device 200. In the scenario illustrated in the communication flow 800, the second mobile communication device 275, may be initially selected (either automatically or in response to user input) to assist with the second SIM call 840 as a redirected call. Thus, the MSMA device 200 may transmit a second incoming call signal 831 to the second mobile communication device 275. The second incoming call signal 831 may include an audio connection setup signal for waking any dormant wireless connection protocols, such as the power save mode 813. The secondary user of the second mobile communication device 275 in various embodiments declines the call, which causes the second mobile communication device 275 to transmit a declined call signal 833 to the MSMA device 200. In some embodiments, the second SIM call 840 may be considered declined if no response is received from the second mobile communication device 275 within a predefined duration.

In response to receiving the declined call signal 833 or no answer, the processor 210 of the MSMA device 200 may reference the audio path preferences 819 in order to identify/determine the third mobile communication device 277 that may already be paired and able to accept the incoming second SIM call 840. In response to identifying and/or determining the third mobile communication device 277, the MSMA device 200 may transmit a second incoming call signal 835 to the third mobile communication device 277. The second incoming call signal 835 may include an audio connection setup signal for waking any dormant wireless connection protocols, such as the power save mode 818. When the third-party user or anyone handling the third mobile communication device 277 accepts the second SIM call 840, a call acceptance signal 837 may be transmitted back to the MSMA device 200. In response to receiving the call acceptance signal 837, the processor 210 of the MSMA device 200 may update a touch screen display (e.g., 220) to indicate that the third mobile communication device 277 has answered the second SIM call 840. In addition, the processor 210 may establish the second SIM call 840, linking signals 839 to/from the corresponding second radio access network and the third mobile communication device 277.

Figure 9:
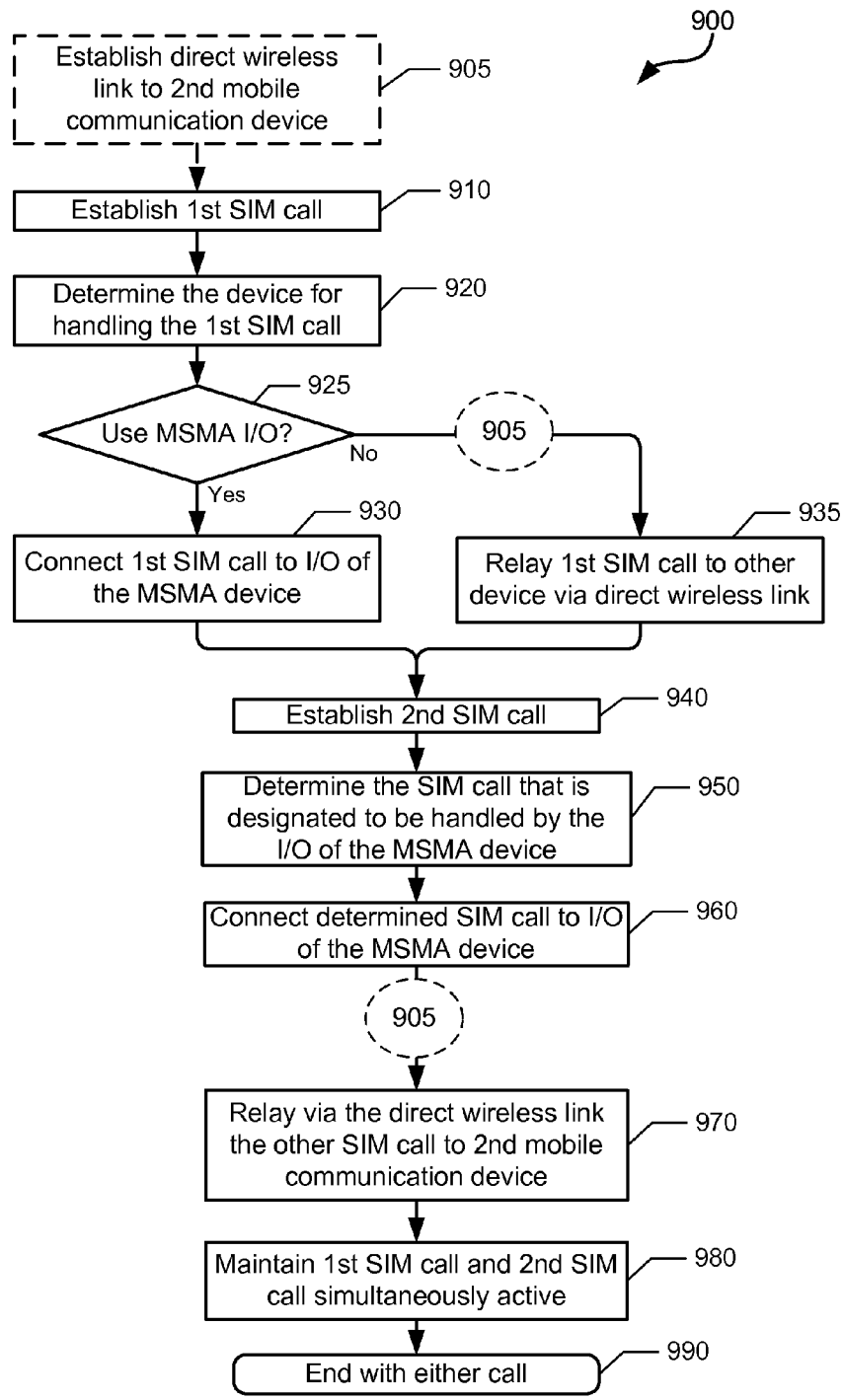
FIG. 9 is a process flow diagram illustrating a method of handling simultaneous calls on a mobile communication device according to various embodiments.

FIG. 9 illustrates a method 900 according to various embodiments for handling simultaneous calls on a MSMA device (e.g., 200 in FIGS. 1-3 and 5-8). With reference to FIGS. 1-9, the MDMA device may have at least the first SIM (e.g., 201) associated with a first radio resource (e.g., the first access network transceiver 260) and a second SIM (e.g., 203) associated with a second radio resource (e.g., the second access network transceiver 270). The operations of the method 900 may be implemented by one or more processors of the MSMA device (e.g., the general-purpose processor 210, the baseband modem processor 211, or a separate controller (not shown)) that may be coupled to the memory (e.g., 212), the voice driver modules (e.g., 230, 240), the AFE component (e.g., 250), and the access network transceivers (e.g., 260, 270).

In block 905, the processor (e.g., 210) of the MSMA device (e.g., 200) may establish a direct wireless link to the second mobile communication device (e.g., 275) and/or the third mobile communication device (e.g., 277) using a third transceiver (e.g., the onboard Bluetooth transceiver 227 or the onboard Wi-Fi transceiver 229) of the MSMA device. In this way, a first direct wireless link may be established with the second mobile communication device and/or a second wireless link may be established with a third mobile communication device. The operations in block 905 may be performed at another point along the process and particularly prior to relaying a SIM call to the second or third mobile communication device (e.g., before block 935 or block 970), and therefore are shown in dashed lines in three locations in FIG. 9. With reference to FIGS. 1-9, establishing a direct wireless link may include a pairing routine for discovering and wirelessly connecting to devices capable of establishing the direct wireless link (e.g., as described with reference to FIGS. 5-8). In addition, establishing the direct wireless link may include exchanging audio connection setup signals between the MSMA device and the second mobile communication device. In some embodiments, the process of establishing a direct wireless link may be segmented, such that a portion of the routine is performed at one point and another portion of the routine performed later. For example, a pairing routine may be performed as an intermediate step, with a final wireless audio connection setup being performed later in the method 900.

In block 910, the processor of the MSMA device may establish the first SIM call. The first SIM call may be received from the first radio access network (i.e., an incoming call) or be initiated by the MSMA device (i.e., an outgoing call). Whether an incoming call or an outgoing call, the first SIM call, which is associated with the first SIM, may connect to the first radio access network via the first transceiver of the MSMA device. Establishing the first SIM call may include service acquisition, authentication, and/or registration with the first radio access network for sending and receiving data using the radio resources associated with the first SIM.

In block 920, the processor of the MSMA device may determine the second mobile communication device that has been designated and/or selected (e.g., by the user) to handle the first SIM call. The determination in block 920 may be based on a user input, a default setting, and/or a predefined user setting. For example, as a default, the MSMA device may be selected to handle the first SIM call consistent with normal mobile communication device operation. As another example, as part of block 920, the user may be prompted regarding available mobile communication devices with an established (or that can establish) a wireless link with the MSMA device, and asked to make a selection.

In determination block 925, the MSMA device processor may determine whether an input/output device (I/O) of the MSMA device (e.g., onboard microphone/speaker 222, 224) will handle the first SIM call or (in the alternative) that the second communication device (e.g., 275) will handle the I/O of the first SIM call.

In response to determining that the first SIM call will be handled by the input/output device (I/O) of the MSMA device (i.e., determination block 925="Yes"), the MSMA device processor may connect the first transceiver to the input/output device (I/O) of the MSMA device in block 930. As part of the operations in block 930, the processor may determine the input/output device coupled to the MSMA device to use for handling the call, which may be one of the speaker/microphone pair within the device, a Bluetooth earpiece coupled to the MSMA device, a wired headset plugged into the MSMA device, or other hands-free device coupled to the MSMA device (e.g., a hands free system built into an automobile).

In response to determining that the first SIM call will not be handled by the input/output device (I/O) of the MSMA device, and thus will be relayed to a second communication device (i.e., determination block 925="No"), the MSMA device processor may configure the second transceiver 270 and the third transceiver (e.g., the onboard Bluetooth transceiver 227 or the onboard Wi-Fi transceiver 229) to relay the first SIM call to the second mobile communication device (or other communication device) in block 935. The operations in block 905 to establish a wireless connection between the MSMA device and the second communication device, or parts of those operations, may optionally be performed in response to the processor determining that the first SIM call is to be relayed when such a connection is not already established as illustrated.

In block 940, the processor of the MSMA device may establish a second SIM call with a second radio access network (e.g., 120) associated with a second SIM (e.g., 203) via the second transceiver (e.g., 270) of the MSMA device. The second SIM call may be established in block 940 as an incoming call or initiated from the MSMA device as an outgoing call. Establishing the second SIM call may include service acquisition, authentication, and/or registration with the second radio access network for sending and receiving data using the radio resources associated with the second SIM. When the second SIM call is initiated or received while the first SIM call is active, as part of establishing the second SIM call the processor may prompt the main user to decide whether to simultaneously maintain active two calls, as well as select the device to use for the second SIM call (i.e., either the MSMA device or another communication device).

In block 950, the processor of the MSMA device may determine which of the first and second SIM calls is designated and/or selected to be handled by the input/output device (I/O) of the MSMA device. The other of the first and second SIM calls will be relayed to the second mobile communication device. The determination in block 950 may be based on the user selection, a default setting and/or a predefined user setting. For example, as part of block 950, the main user may be prompted regarding available mobile communication devices, in addition to the MSMA device itself, and asked to make a selection. As part of selecting device, the main user (e.g., 10) may have the option to switch the device currently handling the first SIM call (e.g., as the scenario described with reference to FIG. 5). As another example, the operations in block 950 may include a memory look-up of predefined user settings to identify the input/output device (I/O) to use under the current operational configuration. For example, if the first SIM call is using the onboard microphone/speaker pair of the MSMA device, the processor may determine that it should relay the second SIM call to a paired second mobile communication device.

In block 960, the processor of the MSMA device may connect the SIM call determined in block 950 to the input/output device of the MSMA device. In block 970, the processor of the MSMA device may configure the first transceiver 260, the second transceiver 270, and the third transceiver 227 to relay whichever of the first or second SIM call is designated to be handled by the second mobile communication device or the like (i.e., the call not determined in block 950 to be handled by the MSMA device).

It should be noted that the wireless connection between the MSMA device and the second communication device may be established in block 905 just prior to relaying the second SIM call to the second communication device as illustrated, particularly in the case in which the first SIM call is being handled by an I/O device of the MSMA device when the second SIM call is established.

The operations performed in blocks 960 and 970 may depend upon the current connections of the first and second SIM calls at the time. For example, the operations in blocks 960 and 970 may involve switching the first SIM call back to an I/O device of the MSMA device to enable relaying the second SIM call to the second communication device when the first SIM call is currently being handled by the second communication device as a result of the operations in block 935. For example, if the first SIM call is being handled by the second communication device but is designated to be handled by the I/O of the MSMA device in block 950, a connection may be established between the first transceiver 260 and a particular I/O device coupled to the MSMA device in block 960, and the second transceiver 270 and the third transceiver (e.g., the onboard Bluetooth transceiver 227 or the onboard Wi-Fi transceiver 229) may be configured to relay the second SIM call to a second mobile communication device in block 970. As another example, if the first SIM call is currently being handled by the second communication device as a result of the operations in block 935 and the second SIM call is designated to be handled by the I/O device of the MSMA device, no change may be made in block 960 to the connections relaying the first SIM call, and a connection may be established between the second transceiver 270 and a particular I/O device coupled to the MSMA device in block 970.

In block 980, the processor of the MSMA device may maintain the two calls simultaneously active, routing received signals to the corresponding output device and relay transmission signals received from input devices to the corresponding transceiver for transmission to respective wireless access networks. The first SIM call and the second SIM call may remain simultaneously active until one or both of the calls is terminated in block 990, whether a connection is lost or one of the calling parties ends the call.

Figure 10:
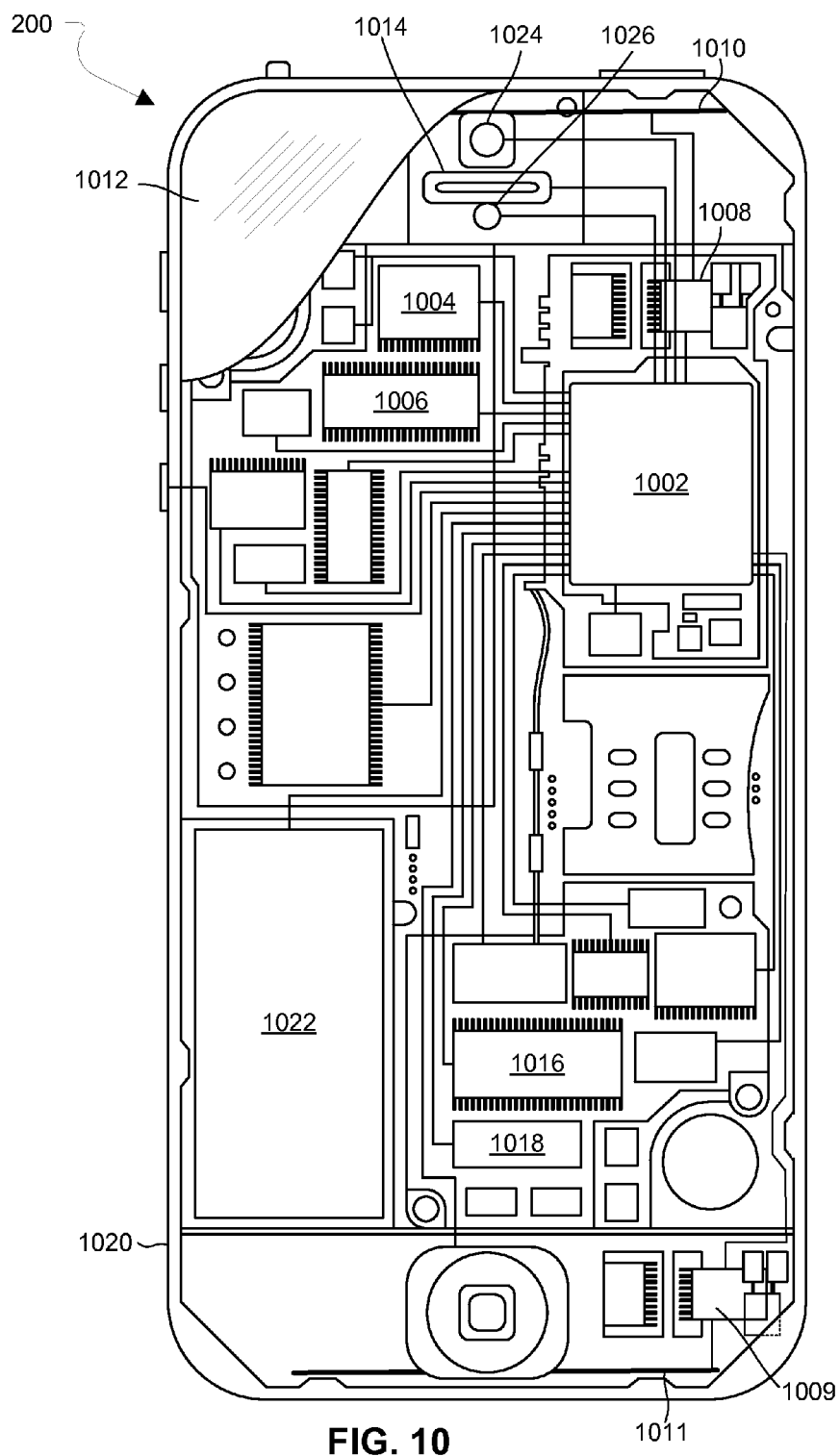
FIG. 10 is a component diagram of an example MSMA device according to various embodiments.

Various embodiments may be implemented in any of a variety of MSMA devices, an example of which is illustrated in FIG. 10. For example, with reference to FIGS. 1-10, the MSMA device 200 may include a processor 1002 coupled to a touch screen controller 1004 and an internal memory 1006. The processor 1002 may be one or more multicore ICs designated for general or specific processing tasks. The internal memory 1006 may be volatile or nonvolatile memory, and may be secure and/or encrypted memory, or unsecure and/or unencrypted memory, or any combination thereof.

The touch screen controller 1004 and the processor 1002 may also be coupled to a touch screen panel 1012, such as a resistive-sensing touch screen, capacitive-sensing touch screen, infrared sensing touch screen, etc. The processor 1002 may be coupled to two or more access network transceivers 1008, 1009 and antennas 1010, 1011 that enable communications via two or more cellular networks for sending and receiving voice and data calls. The access network transceivers 1008, 1009 and antennas 1010, 1011 may be used with the above-mentioned circuitry to implement the various wireless transmission modem stacks and interfaces.

The MSMA device 200 may include a peripheral device connection interface 1018 coupled to the processor 1002. The peripheral device connection interface 1018 may be singularly configured to accept one type of connection, or multiply configured to accept various types of physical and communication connections, common or proprietary, such as USB, FireWire, Thunderbolt, or PCIe. The peripheral device connection interface 1018 may also be coupled to a similarly configured peripheral device connection port (not shown). The MSMA device 200 may also include speakers 1014 for providing audio outputs. The MSMA device 200 may also include a housing 1020, constructed of a plastic, metal, or a combination of materials, for containing all or some of the components discussed herein. The MSMA device 200 may include a power source 1022 coupled to the processor 1002, such as a disposable or rechargeable battery. The rechargeable battery may also be coupled to the peripheral device connection port to receive a charging current from a source external to the MSMA device 200.

Figure 11:
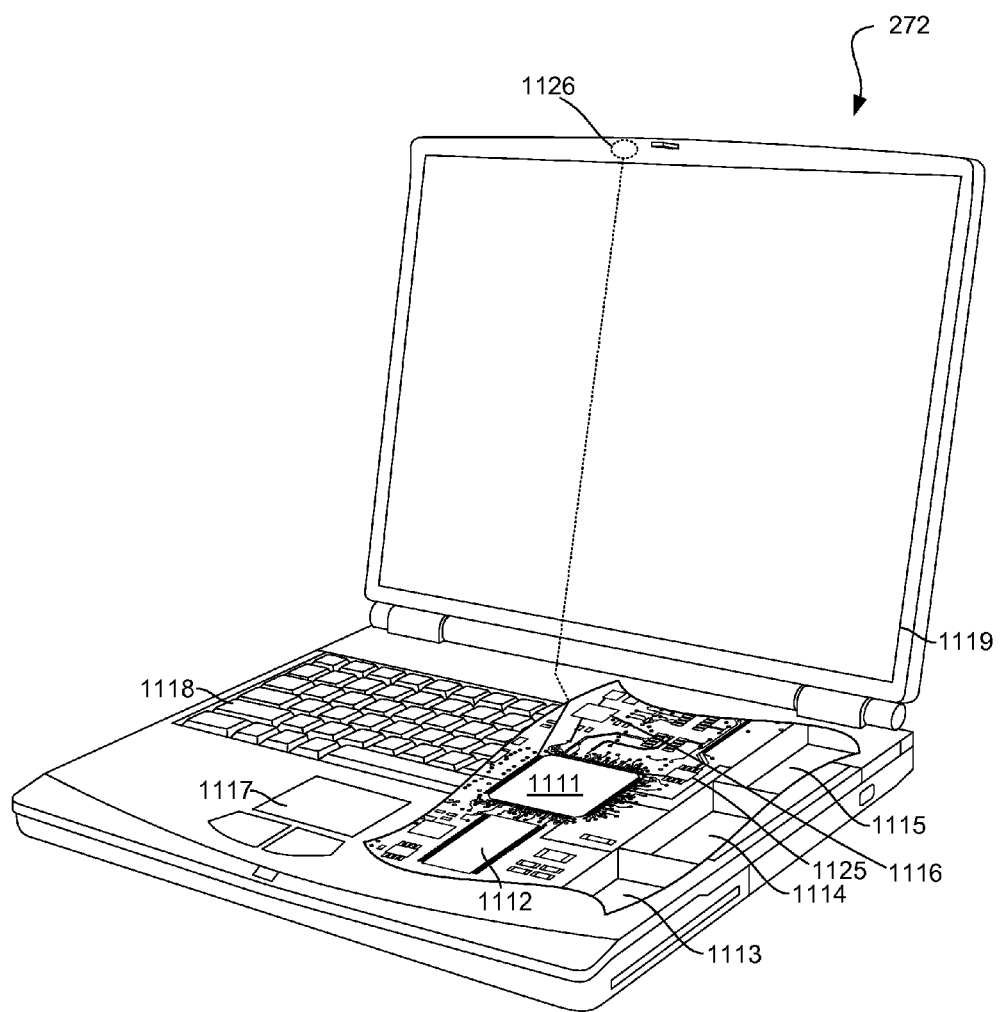
FIG. 11 is a component diagram of an example MSMA mobile communication device according to various embodiments.

Various embodiments described above may also be implemented within a variety of personal computing devices, such as a laptop computer 279 as illustrated in FIG. 11. With reference to FIGS. 1-11, such personal computing devices may service as the primary MSMA device described generally above or even the second mobile communication device 275 and/or the third mobile communication device 277. Many laptop computers include a touch pad touch surface 1117 that serves as the computer's pointing device, and thus may receive drag, scroll, and flick gestures similar to those implemented on mobile communication devices equipped with a touch screen display as described. A laptop computer 279 will typically include a processor 1111 coupled to volatile memory 1112 and a large capacity nonvolatile memory, such as a disk drive 1113 of Flash memory. The laptop computer 279 may also include a floppy disc drive 1114 and a compact disc (CD) drive 1115 coupled to the processor 1111. The laptop computer 279 may also include a number of connector ports coupled to the processor 1111 for establishing data connections or receiving external memory devices, such as a USB or FireWire® connector sockets, or other network connection circuits for coupling the processor 1111 to a network. In a notebook configuration, the computer housing includes the touch pad touch surface 1117, the keyboard 1118, and the display 1119 all coupled to the processor 1111. Other configurations of the computing device may include a computer mouse or trackball coupled to the processor (e.g., via a USB input) as are well known, which may also be use in conjunction with various embodiments.

The processors 210, 211, 1002, 1111 (in FIGS. 2, 10, and 11 respectively), may be any programmable microprocessor, microcomputer or multiple processor chip or chips that can be configured by software instructions (applications) to perform a variety of functions, including the functions of various embodiments described above. In some devices, multiple processors may be provided, such as one processor dedicated to wireless communication functions and one processor dedicated to running other applications. Typically, software applications may be stored in the internal memory 212, 1006, 1112, 1113 (referring again to FIGS. 2, 10, and 11 respectively) before they are accessed and loaded into the processors 210, 211, 1002, 1111. Processors 210, 211, 1002, 1111 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 210, 211, 1002, 1111 including internal memory or removable memory plugged into the MSMA device and memory within the processor 210, 211, 1002, 1111, themselves.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

While the terms "first" and "second" are used herein to describe data transmission associated with a SIM and data receiving associated with a different SIM, such identifiers are merely for convenience and are not meant to limit various embodiments to a particular order, sequence, type of network or carrier.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of handling simultaneous calls on a multi-subscriber identification module (multi-SIM) multi-active (MSMA) device having at least a first subscriber identification module (SIM) associated with a first transceiver and a second SIM associated with a second transceiver, comprising:

establishing a first SIM call using the first transceiver;
   establishing a second SIM call using the second transceiver while the first SIM call is active;
   establishing a direct wireless link to a second mobile communication device using a third transceiver;
   maintaining simultaneously active both the first and second SIM calls by relaying one of the first and second SIM calls to the second mobile communication device via the direct wireless link and using an input/output device of the MSMA device for the other of the first and second SIM calls; and
   in response to one of the first SIM call or the second SIM call terminating, prompting a user regarding how to manage the other one of the first SIM call or the second SIM call that was not terminated.

2. The method of claim 1, wherein establishing the direct wireless link includes pairing the second mobile communication device with the MSMA device before establishing the second SIM call.

3. The method of claim 1, wherein establishing the direct wireless link includes pairing the second mobile communication device with the MSMA device in response to establishing the second SIM call.

4. The method of claim 1, wherein the direct wireless link is a Bluetooth communication link between the MSMA device and the second mobile communication device.

5. The method of claim 1, wherein the direct wireless link is a Wi-Fi communication link between the MSMA device and the second mobile communication device.

6. The method of claim 1, wherein the input/output device of the MSMA device is an onboard microphone and an onboard speaker of the MSMA device.

7. The method of claim 1, wherein the input/output device of the MSMA device is a remote device coupled to the MSMA device.

8. The method of claim 1, wherein at least one of the first SIM call and the second SIM call is an incoming voice call received by the MSMA device.

9. The method of claim 1, wherein at least one of the first SIM call and the second SIM call is an outgoing voice call initiated from the MSMA device.

10. The method of claim 1, wherein establishing the second SIM call using the second transceiver while the first SIM call is active comprises:
receiving the second SIM call while the first SIM call is maintained active;
prompting the user regarding at least one of the first and second SIM calls; and
receiving a user input regarding simultaneously maintaining active both the first and second SIM calls,
wherein the second SIM call is established in response to the received user input electing to accept the second SIM call and maintain the first SIM call active.

11. The method of claim 1, further comprising:
receiving a user input selecting one of the MSMA device and the second mobile communication device to use for the second SIM call, wherein the one of the first and second SIM calls is relayed to the second mobile communication device based on the received user input.

12. The method of claim 1, further comprising:
transmitting an incoming call signal to the second mobile communication device over the direct wireless link; and
receiving a call acceptance signal from the second mobile communication device in response to transmitting the incoming call signal,
wherein relaying the one of the first and second SIM calls to the second mobile communication device via the direct wireless link is in response to receiving the call acceptance signal from the second mobile communication device.

13. The method of claim 1,
wherein prompting the user regarding how to manage the other one of the first SIM call or the second SIM call that was not terminated includes prompting the user regarding whether to establish a communication feed between the second transceiver and the input/output device of the MSMA device for handling the second SIM call.

14. The method of claim 1,
wherein prompting the user regarding how to manage the other one of the first SIM call or the second SIM call that was not terminated includes prompting the user regarding whether to maintain active the other one of the first SIM call or the second SIM call that was not terminated using both the input/output device of the MSMA device and the second mobile communication device via the direct wireless link.

15. The method of claim 1,
wherein prompting the user regarding how to manage the other one of the first SIM call or the second SIM call includes prompting the user regarding whether to terminate the other one of the first SIM call or the second SIM call that was not terminated.

16. The method of claim 1, wherein the third transceiver communicates using a type of protocol that is different from that of the first transceiver and the second transceiver.

17. A multi-subscriber identification module (multi-SIM) device, comprising:
a first transceiver;
a second transceiver;
a third transceiver;
an input/output device; and
a processor coupled to the first transceiver, the second transceiver, the third transceiver, and the input/output device, and configured to be coupled to a first subscriber identification module (SIM), and a second SIM, wherein the processor is configured with processor-executable instructions to:
establish a first SIM call using the first transceiver;
establish a second SIM call using the second transceiver while the first SIM call is active;
establish a direct wireless link to a second mobile communication device using the third transceiver;
maintain simultaneously active both the first and second SIM calls by relaying one of the first and second SIM calls to the second mobile communication device via the direct wireless link and using the input/output device for the other of the first and second SIM calls; and
in response to one of the first SIM call or the second SIM call terminating, prompting a user regarding how to manage the other one of the first SIM call or the second SIM call that was not terminated.

18. The multi-SIM device of claim 17, wherein the processor is further configured with processor executable instructions to establish the direct wireless link by pairing the second mobile communication device with the multi-SIM device before establishing the second SIM call.

19. The multi-SIM device of claim 17, wherein the processor is further configured with processor executable instructions to establish the direct wireless link by pairing the second mobile communication device with the multi-SIM device in response to establishing the second SIM call.

20. The multi-SIM device of claim 17, wherein prompting the user regarding how to manage the other one of the first SIM call or the second SIM call that was not terminated includes prompting the user regarding whether to establish a communication feed between the second transceiver and the input/output device of the MSMA device for handling the second SIM call.

21. The multi-SIM device of claim 17, wherein prompting the user regarding how to manage the other one of the first SIM call or the second SIM call that was not terminated includes prompting the user regarding whether to maintain active the other one of the first SIM call or the second SIM call that was not terminated using both the input/output device of the MSMA device and the second mobile communication device via the direct wireless link.

22. The multi-SIM device of claim 17, wherein the input/output device is an onboard microphone and an onboard speaker of the multi-SIM device.

23. The multi-SIM device of claim 17, wherein the input/output device is a remote device coupled to the multi-SIM device.

24. The multi-SIM device of claim 17, wherein the third transceiver communicates using a type of protocol that is different from that of the first transceiver and the second transceiver.

25. The multi-SIM device of claim 17, wherein prompting the user regarding how to manage the other one of the first SIM call or the second SIM call includes prompting the user regarding whether to terminate the other one of the first SIM call or the second SIM call that was not terminated.

26. The multi-SIM device of claim 17, wherein the processor is further configured with processor executable instructions to:
receive the second SIM call while the first SIM call is maintained active;

prompt the user regarding at least one of the first and second SIM calls; and receive a user input regarding simultaneously maintaining active both the first and second SIM calls, wherein the second SIM call is established in response to the received user input electing to accept the second SIM call and maintain the first SIM call active.

27. The multi-SIM device of claim 17, wherein the processor is further configured with processor executable instructions to:

receive a user input selecting one of the multi-SIM device and the second mobile communication device to use for the second SIM call, wherein the one of the first and second SIM calls is relayed to the second mobile communication device based on the received user input.

28. The multi-SIM device of claim 17, wherein the processor is further configured with processor executable instructions to:

transmit an incoming call signal to the second mobile communication device over the direct wireless link;

receive a call acceptance signal from the second mobile communication device in response to transmitting the incoming call signal, wherein the one of the first and second SIM calls is relayed to the second mobile communication device via the direct wireless link in response to receiving the call acceptance signal from the second mobile communication device.

29. An multi-subscriber identification module (multi-SIM) device, comprising:

means for establishing a first subscriber identification module (SIM) call using a first transceiver of the multi-SIM device;

means for establishing a second SIM call using a second transceiver of the multi-SIM device while the first SIM call is active;

means for establishing a direct wireless link to a second mobile communication device using a third transceiver;

means for maintaining simultaneously active both the first and second SIM calls by relaying one of the first and second SIM calls to the second mobile communication device via the direct wireless link and using an input/output device of the MSMA device for the other of the first and second SIM calls; and means for prompting a user, in response to one of the first SIM call or the second SIM call terminating, regarding how to manage the other one of the first SIM call or the second SIM call that was not terminated.

30. A non-transitory processor-readable storage medium having stored thereon processor-executable instructions configured to cause a processor to perform operations for handling simultaneous calls on a multi-subscriber identification module (multi-SIM) multi-active (MSMA) device having at least a first subscriber identification module (SIM) associated with a first transceiver and a second SIM associated with a second transceiver, the operations comprising:

establishing a first SIM call using the first transceiver;

establishing a second SIM call using the second transceiver while the first SIM call is active;

establishing a direct wireless link to a second mobile communication device using a third transceiver;

maintaining simultaneously active both the first and second SIM calls by relaying one of the first and second SIM calls to the second mobile communication device via the direct wireless link and using an input/output device of the MSMA device for the other of the first and second SIM call; and in response to one of the first SIM call or the second SIM call terminating, prompting a user regarding how to manage the other one of the first SIM call or the second SIM call that was not terminated.

* * * * *